US009201426B1

(12) United States Patent
Bonawitz

(10) Patent No.: US 9,201,426 B1
(45) Date of Patent: Dec. 1, 2015

(54) REVERSE ITERATION OF PLANNING DATA FOR SYSTEM CONTROL

(71) Applicant: Google Inc., Mountain View, CA (US)

(72) Inventor: Keith Allen Bonawitz, Berkeley, CA (US)

(73) Assignee: Google Inc., Mountain View, CA (US)

( * ) Notice: Subject to any disclaimer, the term of this patent is extended or adjusted under 35 U.S.C. 154(b) by 1 day.

(21) Appl. No.: 14/183,771

(22) Filed: Feb. 19, 2014

(51) Int. Cl.
| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *G05D 1/10* | (2006.01) |

(52) U.S. Cl.
CPC ...................................... *G05D 1/105* (2013.01)

(58) Field of Classification Search
CPC ....... G06N 3/049; G06N 3/08; G06N 99/005; G06N 3/02; G06N 2/10; B60W 50/00; B60W 10/18; B60W 30/18; B60W 40/08; B60W 10/04; G05D 2201/0201; G05D 1/021; G05D 1/0217; G05D 1/02; G05D 1/027; G05D 1/028; G01C 21/3691; G01C 21/365; G01C 21/36; G01C 21/20; G01C 21/32
USPC ......... 701/3, 2, 25, 26, 42, 24, 50, 22, 48, 70, 701/93, 466; 706/20, 23, 15, 27, 16
See application file for complete search history.

(56) References Cited

U.S. PATENT DOCUMENTS

| | | | | |
|---|---|---|---|---|
| 4,802,096 | A * | 1/1989 | Hainsworth et al. | 701/301 |
| 5,959,574 | A * | 9/1999 | Poore, Jr. | 342/96 |
| 6,167,263 | A | 12/2000 | Campbell | |
| 6,230,099 | B1 * | 5/2001 | Fabian | 701/533 |
| 6,402,090 | B1 * | 6/2002 | Aaron | 244/24 |
| 6,611,755 | B1 * | 8/2003 | Coffee et al. | 701/482 |
| 6,628,941 | B2 * | 9/2003 | Knoblach et al. | 455/431 |
| 6,904,335 | B2 | 6/2005 | Solomon | |
| 7,026,980 | B1 * | 4/2006 | Mavroudakis et al. | 342/90 |
| 7,132,975 | B2 * | 11/2006 | Fullerton et al. | 342/28 |
| 7,603,212 | B2 * | 10/2009 | Ariyur et al. | 701/23 |
| 7,805,481 | B1 * | 9/2010 | Everest | 708/511 |
| 7,913,948 | B2 | 3/2011 | Porter | |
| 8,170,747 | B2 * | 5/2012 | Chen et al. | 701/36 |
| 8,275,499 | B2 * | 9/2012 | Coulmeau et al. | 701/14 |
| 8,412,445 | B2 * | 4/2013 | Uyeki | 701/117 |
| 8,494,689 | B1 * | 7/2013 | Ashton | 701/3 |
| 8,781,727 | B1 * | 7/2014 | Bonawitz et al. | 701/422 |
| 8,849,571 | B1 * | 9/2014 | Bonawitz et al. | 701/527 |

(Continued)

*Primary Examiner* — Calvin Cheung
*Assistant Examiner* — Luis A. Martinez Borrero
(74) *Attorney, Agent, or Firm* — McDonnell Boehnen Hulbert & Berghoff LLP

(57) ABSTRACT

Methods and systems for reverse-iterating a backward planner determining trajectories for vehicles of a fleet of vehicles are provided. In one example an iterator configured for recursively determining the contingency tables at successive time steps in a computational iteration order from a target time to an initial time is caused to reverse-generate the contingency tables in an order from the initial time to the target time. Reverse-generation is caused by recursively: (i) subdividing a sequence of time steps by a factor of at least two into successively smaller sub-sequences, (ii) iterating in a computational iteration order over each recursively subdivided sub-sequence, and (iii) generating a contingency table closest in time to the initial time for the recursive iteration over each recursively subdivided sub-sequence.

21 Claims, 12 Drawing Sheets

(56) References Cited

U.S. PATENT DOCUMENTS

| | | | |
|---|---|---|---|
| 8,874,356 B1* | 10/2014 | Bonawitz | 701/120 |
| 8,880,326 B1* | 11/2014 | Bonawitz et al. | 701/120 |
| 2002/0065603 A1* | 5/2002 | Watanabe et al. | 701/207 |
| 2004/0243381 A1* | 12/2004 | Kuturianu et al. | 703/22 |
| 2004/0263386 A1* | 12/2004 | King et al. | 342/357.06 |
| 2006/0167869 A1* | 7/2006 | Jones | 707/4 |
| 2009/0267740 A1* | 10/2009 | Pizzuto | 340/10.1 |
| 2010/0317420 A1* | 12/2010 | Hoffberg | 463/1 |
| 2011/0147513 A1* | 6/2011 | Surmont | 244/33 |
| 2012/0042315 A1* | 2/2012 | Attwell | 718/102 |
| 2012/0120230 A1* | 5/2012 | Wilkerson et al. | 348/135 |
| 2012/0286991 A1* | 11/2012 | Chen et al. | 342/357.23 |
| 2013/0226373 A1 | 8/2013 | Bollapragada | |
| 2014/0188377 A1* | 7/2014 | Bonawitz et al. | 701/120 |

* cited by examiner

REVERSE ITERATION OF PLANNING DATA FOR SYSTEM CONTROL

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, example embodiments provide a method comprising: at a system including one or more processors, receiving a specification for N time steps at which to compute N corresponding contingency tables of contingent balloon flight states for at least one balloon, wherein the N time steps define a sequence of time steps in a range between an initial time and a target time; by an iterator implemented by at least one of the one or more processors, reverse-generating the N contingency tables in an order from the initial time to the target time, wherein the iterator is configured for recursively determining the contingency tables at successive time steps in a computational iteration order from the target time to the initial time; for the at least one balloon, determining a sequence of planned balloon flight states from the reverse-generated contingency tables, ordered from the initial time to the target time, corresponding to a predicted balloon flight trajectory that is within a threshold of a quantitative flight-plan objective; and providing at least one flight command from the determined sequence of planned balloon flight states to the at least one balloon, in order to cause the at least one balloon to attempt to follow at least a portion of the predicted flight trajectory, wherein reverse-generating the contingency tables in the order from the initial time to the target time comprises: recursively (i) subdividing the sequence of time steps by a factor of at least two into successively smaller sub-sequences, (ii) iterating in the computational iteration order over each recursively subdivided sub-sequence, and (iii) generating a contingency table closest in time to the initial time for the recursive iteration over each recursively subdivided sub-sequence.

In another aspect, example embodiments provide a non-transient computer-readable storage medium having stored therein instructions, that when executed by a computing device, cause the computing device to perform functions comprising: receiving a specification for N time steps at which to compute N corresponding contingency tables of contingent balloon flight states for at least one balloon, wherein the N time steps define a sequence of time steps in a range between an initial time and a target time; reverse-generating the N contingency tables in an order from the initial time to the target time by using an iterator function configured for recursively determining the contingency tables at successive time steps in a computational iteration order from the target time to the initial time; for the at least one balloon, determining a sequence of planned balloon flight states from the reverse-generated contingency tables, ordered from the initial time to the target time, corresponding to a predicted balloon flight trajectory that is within a threshold of a quantitative flight-plan objective; and providing at least one flight command from the determined sequence of planned balloon flight states to the at least one balloon, in order to cause the at least one balloon to attempt to follow at least a portion of the predicted flight trajectory, wherein reverse-generating the contingency tables in the order from the initial time to the target time comprises: recursively (i) subdividing the sequence of time steps by a factor of at least two into successively smaller sub-sequences, (ii) iterating in the computational iteration order over each recursively subdivided sub-sequence, and (iii) generating a contingency table closest in time to the initial time for the recursive iteration over each recursively subdivided sub-sequence.

In still another aspect, example embodiments provide a system comprising: at least one processor; and data storage comprising program instructions executable by the at least one processor to cause the system to perform functions comprising: receiving a specification for N time steps at which to compute N corresponding contingency tables of contingent balloon flight states for at least one balloon, wherein the N time steps define a sequence of time steps in a range between an initial time and a target time; reverse-generating the N contingency tables in an order from the initial time to the target time by using an iterator function configured for recursively determining the contingency tables at successive time steps in a computational iteration order from the target time to the initial time; for the at least one balloon, determining a sequence of planned balloon flight states from the reverse-generated contingency tables, ordered from the initial time to the target time, corresponding to a predicted balloon flight trajectory that is within a threshold of a quantitative flight-plan objective; and providing at least one flight command from the determined sequence of planned balloon flight states to the at least one balloon, in order to cause the at least one balloon to attempt to follow at least a portion of the predicted flight trajectory, wherein reverse-generating the contingency tables in the order from the initial time to the target time comprises: recursively (i) subdividing the sequence of time steps by a factor of at least two into successively smaller sub-sequences, (ii) iterating in the computational iteration order over each recursively subdivided sub-sequence, and (iii) generating a contingency table closest in time to the initial time for the recursive iteration over each recursively subdivided sub-sequence.

These as well as other aspects, advantages, and alternatives, will become apparent to those of ordinary skill in the art by reading the following detailed description, with reference where appropriate to the accompanying figures.

DETAILED DESCRIPTION

Figure 1:
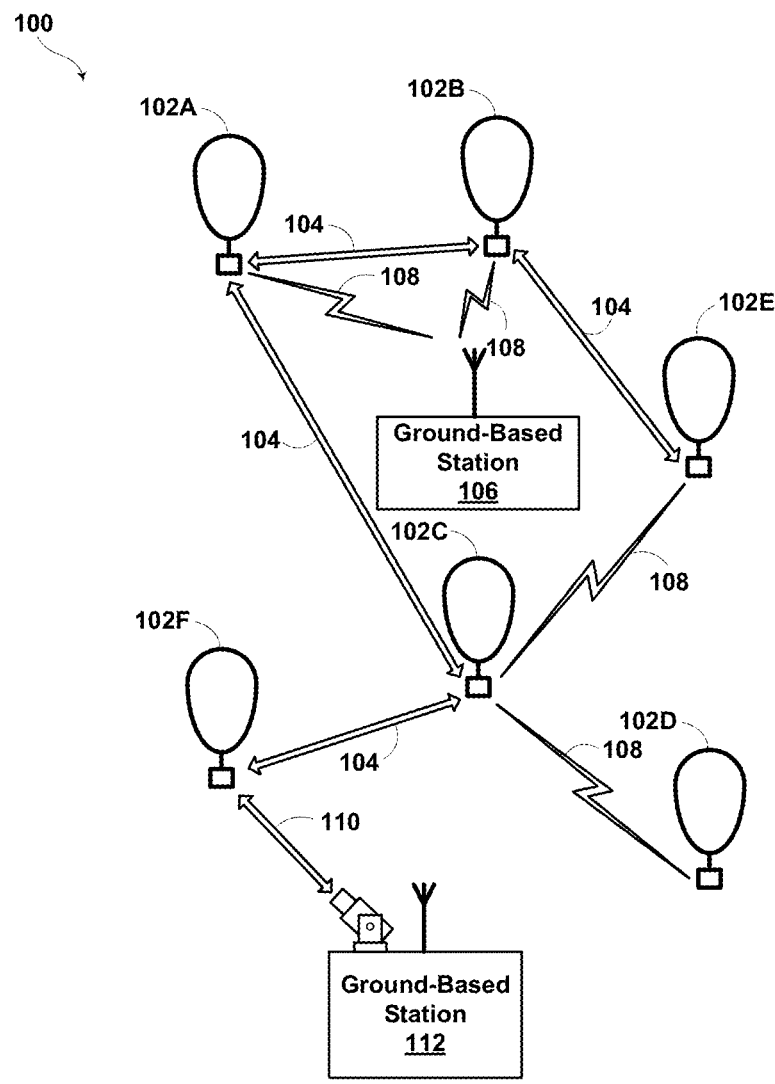
FIG. 1 is a block diagram illustrating an example balloon network.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Examples herein may be configured to provide control of vehicles within a fleet of vehicles. The vehicles may be any number of types of vehicles including, for example, autonomous or semi-autonomous vehicles, such as aerial vehicles, boats, underwater vehicles, satellites, aerostats, etc. for mapping/surveying, sensing, providing connectivity, etc. In other examples, methods described herein may be used to control or dispatch autonomous cars to maintain a well-distributed fleet of autonomous taxis in a city to support rapid dispatch of taxis. The vehicles may be any type of mobile object, element, platform, etc.

In still further examples, vehicles may be or include elements of a data network that includes a plurality of balloons, for example, configured as a mesh network formed by high-altitude balloons deployed in the stratosphere. Since winds in the stratosphere may affect locations of the balloons in a differential manner, each balloon in an example network may be configured to change its horizontal position by adjusting its vertical position (i.e., altitude). For example, by adjusting its altitude, a balloon may be able find winds that will carry the balloon horizontally (e.g., latitudinally and/or longitudinally) to a desired horizontal location. In other examples, each balloon may be configured to change its horizontal position using propellers or other mechanisms to generate horizontal thrust rather than or in addition to adjusting its horizontal position by adjusting its vertical position.

Within examples, methods and systems are described with respect to elements of a fleet of vehicles being balloons in a fleet of balloons arranged as a data network. However, as mentioned above, methods and systems herein may be applicable to other types of vehicles of a fleet of vehicles, and thus, the examples described are not limiting.

When managing a fleet of autonomous balloons, a fleet administrator or computer may determine a sequence of coverage requirements for the fleet. The sequence of coverage requirements may specify desired amounts of balloon coverage for different parts of the world. For instance, the desired amounts of balloon coverage may include providing at least ten balloons in a first area, at least five balloons in a second area, and at least eighteen balloons in a third area at a first instance in time and then, at a second instance in time, providing at least five balloons in the first area, ten balloons in the second area, and twenty balloons in the third area. In one example, in order for a fleet of balloons to satisfy the coverage requirements, a fleet plan that stages balloons in particular places ahead of deadlines such that the balloons will be able to arrive at a desired location on time may be required. Therefore, to control the fleet of balloons, a simultaneous plan of trajectory for many balloons at many different starting locations is needed, and each balloon may take a different path.

Given the initial position of one or more balloons of a fleet of balloons and a sequence of coverage requirements, systems and methods for determining trajectories for each balloon of the fleet that satisfy the sequence of requirements are provided. According to an example method, initial positions of each balloon of a fleet of balloons as well as a sequence of coverage requirements may be received or determined. The coverage requirements may be goal distributions for the fleet that are defined with respect to various landmarks of a region of interest. For example, the region of interest may include a small region of the Earth or possibly the entire Earth, and the landmarks may be individual locations, positions, or subregions within the region of interest. In one example, the coverage requirements may specify a desired number of balloons, or goal, for each landmark at various times within a planning period of time. The desired number of balloons is but one objective function on the balloon distribution. In other examples, the coverage requirement may be specified in another form. Thus the coverage requirements may be specified according to any objective function on the balloon distribution among the region of interest.

Additionally, the period of time may then be divided into a plurality of phases. For instance each phase may correspond to a time interval within the period of time. Within each phase, a summary of which landmarks are reachable by a balloon from which other landmarks may be determined based on predicted wind conditions for the region of interest. For example, for each phase and respective landmark, a set of starting landmarks from which a balloon could reach the respective landmark by following one or more predicted winds at one or more altitudes during the phase may be found.

Given the summary of which landmarks are reachable from other landmarks during each phase as well as the goal number of balloons for each landmark at the end of each phase, a determination regarding which landmark that each balloon should travel to during each phase may be made. For instance, trajectories for each balloon that satisfy the sequence of coverage requirements may be determined by solving an optimization problem.

Planning flight trajectories for one or a fleet of balloons to achieve one or more specified objectives, such as coverage requirements, is an example of a class of problems that can be solved via dynamic programming. In particular, using dynamic programming, a planning algorithm or technique may be run with a complete set of contingencies. In one example, a planning algorithm based on dynamic programming may generate large tables, designated herein by way of example as "A" and "V," which specify that for a system in given state S(t) at time t, an action A[S(t), t] should be taken in order to maximize an expected reward over a planning period, and that the expected reward is V[S(t), t]. Then after some time Δt transpires, the table will be consulted again in order to determine a next action, and so on.

As a practical matter, time A and V may be discretized by computing S, A, and V at discrete time steps $t=t_n$, $n=1, 2, \ldots, N$, where $t_{n+1}-t_n=\Delta t$. For purposes of convenience in the discussion herein, discrete time t may occasionally be abbreviated as $t=1, 2, \ldots, N$, where it is understood that the numbers signify a time step, but not necessarily a time value.

In some applications, the data may be computed in reverse chronological order, such that all the data for $A[S(t_n), t_n]$ and $V[S(t_n), t_n]$ may be computed before the data for $A[S(t_{n-1}), t_{n-1}]$ and $V[S(t_{n-1}), t_{n-1}]$ can be computed, and so on. In one example, $V[S(t_n), t_n]$ is the set of information required to compute $A[S(t_{n-1}), t_{n-1}]$ and $V[S(t_{n-1}), t_{n-1}]$. Thus, instead of producing the full A[S,T] and V[S,T] array, the algorithm can output the data in slices in the order $t_n, t_{n-1}, t_{n-2}, \ldots, t_1$.

It can sometimes be the case that the planning program needs to access the data in chronological order: $t_1, t_2, t_3, \ldots, t_N$. For example, in order to simulate a balloon executing one of these plans, states may need to be evolved chronologically. Specifically, in a simulation, the state of the balloon at time $t_1$ may be known to be $S(t_1)=S_1$. The simulation may then look up the action the balloon should take according to $A[S_1, t_1]$, and then simulate the balloon taking this action in order to compute the state $S_2$ that the balloon will be in at time $t_2$. This process may then repeat by looking up the next action in $A[S_2, t_2]$ in order to compute the state $S_3$ that the balloon will be in at time $t_3$, and so on.

In other examples applications, data may be generated in an order from $t_1$ to $t_N$, but may need to be accessed in the reverse order, from $t_N$ to $t_1$. Both types of examples involve circumstances in which iteratively generated data need to be accessed in an order opposite from the computational iteration order.

For large-scale planning, such as can be the case for a fleet of balloons (or other autonomous vehicles), the complete contingency tables (e.g., A and V tables) can become quite large in view of data storage requirements and the speed at which stored data may be accessed (e.g., random access read/write/transfer operations). Furthermore, generation of the data and data structures that hold the generated data may be computationally expensive, making generation of the complete tables all the more computationally costly. Large size and computation costs can pose practical challenges when the data need to be accessed in an order opposite the computational iteration order in which the data are computed. Accordingly, it would be desirable to devise an efficient means of iterating over the output of a planner in a reverse order from the order in which the planner produces its output.

Example embodiments described herein provide a system and method for implementing technique for reversing any finite-length duplicatable iterator. While developed and described in the context of balloon fleet planning, the system and method can be adapted for application in any scenario where an iteration (including all linear recursions) needs to be reversed from its computationally-defined ("natural") iteration order. As will be described in detail below, example embodiments can achieve reverse-iteration of data in far more efficient combination of data storage and computational operations that conventional approaches. The increase in efficiency can make it possible to implement planning tools that might otherwise be impractical.

Referring now to the Figures, FIG. 1 is a block diagram illustrating an example balloon network 100. As shown, the balloon network 100 includes balloons 102A to 102F, which are configured to communicate with one another via free-space optical links 104 and/or RF links 108. Configured as such, balloons 102A to 102F may collectively function as a mesh network for packet-data communications. Further, at least some of balloons 102A and 102B may be configured for RF communications with ground-based stations 106 via respective RF links 108. Yet further, some balloons, such as balloon 102F, may be configured to communicate via optical link 110 with ground-based station 112.

In an exemplary embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an exemplary embodiment, high-altitude balloons may be generally configured to operate in an altitude range within the stratosphere that has a wide range of wind speeds. For instance, between 17 km and 20 km altitude above the surface, the average wind speed may be between about 30 mph to about 35 mph, while the max wind speed may be up to 200 mph. As another example, at about 26 km altitude above the surface, the average wind speed may be between about 60 mph to about 65 mph, while the max wind speed may exceed 300 mph.

More specifically, in a high-altitude-balloon network, balloons 102A to 102F may generally be configured to operate at altitudes between 18 km and 25 km (although other altitudes are possible). At such altitudes, the winds may vary with latitude and by season, and the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an exemplary embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers.

In a further aspect, balloons 102A to 102F may utilize one or more of various different RF air-interface protocols for communication with ground-based stations 106 via respective RF links 108. For instance, some or all of balloons 102A to 102F may be configured to communicate with ground-based station 106 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect in balloon network 100, balloon 102F is configured as a downlink balloon to provide a high-capacity air-ground link. Like other balloons in an exemplary network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and ground-based station 112.

Note that in some implementations, a downlink balloon 102F may additionally be operable for RF communication with ground-based station 106. In other cases, a downlink balloon 102F may only use an optical link for balloon-to-ground communications. Further, while the arrangement shown in FIG. 1 includes just one downlink balloon 102F, an exemplary balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104.

Ground-based stations, such as ground-based station 106 and/or 112, may include components such as transceivers, transmitters, and/or receivers for communication via RF links and/or optical links with a balloon network. Further, a ground-based station may use various air-interface protocols in order to communicate with a balloon 102A to 102F over an RF link. As such, a ground-based station 106 may be configured as an access point via which various devices can connect to balloon network 100.

In a further aspect, some or all balloons 102A to 102F could be configured to establish a communication link with space-based satellites in addition to, or as an alternative to, a ground-based communication link. In some embodiments, a balloon may communicate with a satellite via an optical link.

Further, some ground-based stations, such as ground-based station 106, may be configured as gateways between balloon network 100 and one or more other networks. Such a ground-based station 106 may thus serve as an interface between the balloon network and the Internet, a cellular service provider's network, and/or other types of networks.

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to the balloon and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an exemplary balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. For instance, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, the same wavelength can be assigned for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

In some examples, a balloon network 100 may have a non-uniform topology. For instance, exemplary embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be more dense over land than over large bodies of water. Many other examples of non-uniform topologies are possible.

Figure 2:
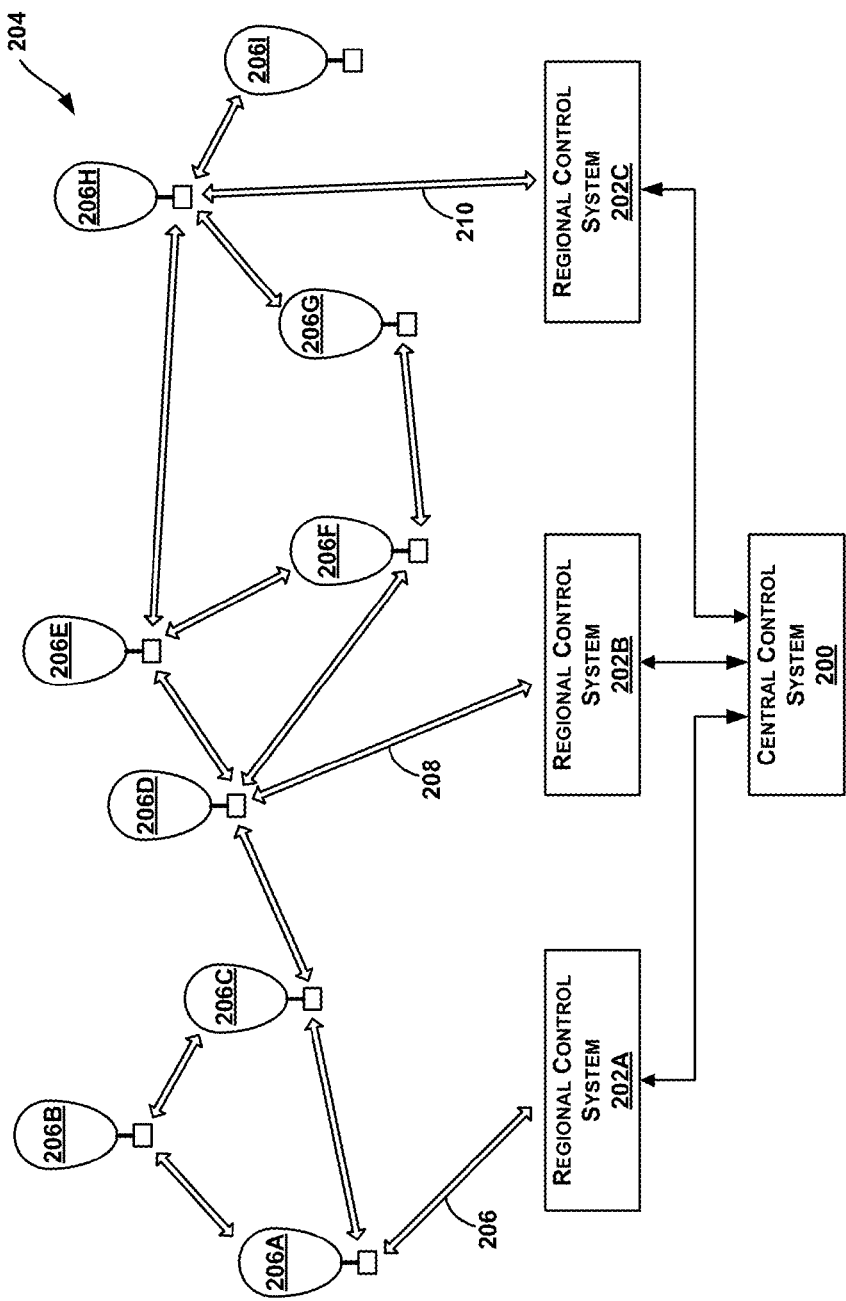
FIG. 2 is a block diagram illustrating an example balloon-network control system.

FIG. 2 is a block diagram illustrating an example balloon-network control system. In particular, FIG. 2 shows a distributed control system, which includes a central control system 200 and a number of regional control-systems 202A to 202C. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that the balloons cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 204A, 204D, and 204H are configured as downlink balloons. As such, regional control systems 202A to 202C may respectively communicate with balloons 204A, 204D, and 204H via optical links 206, 208, and 210, respectively.

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Figure 3:
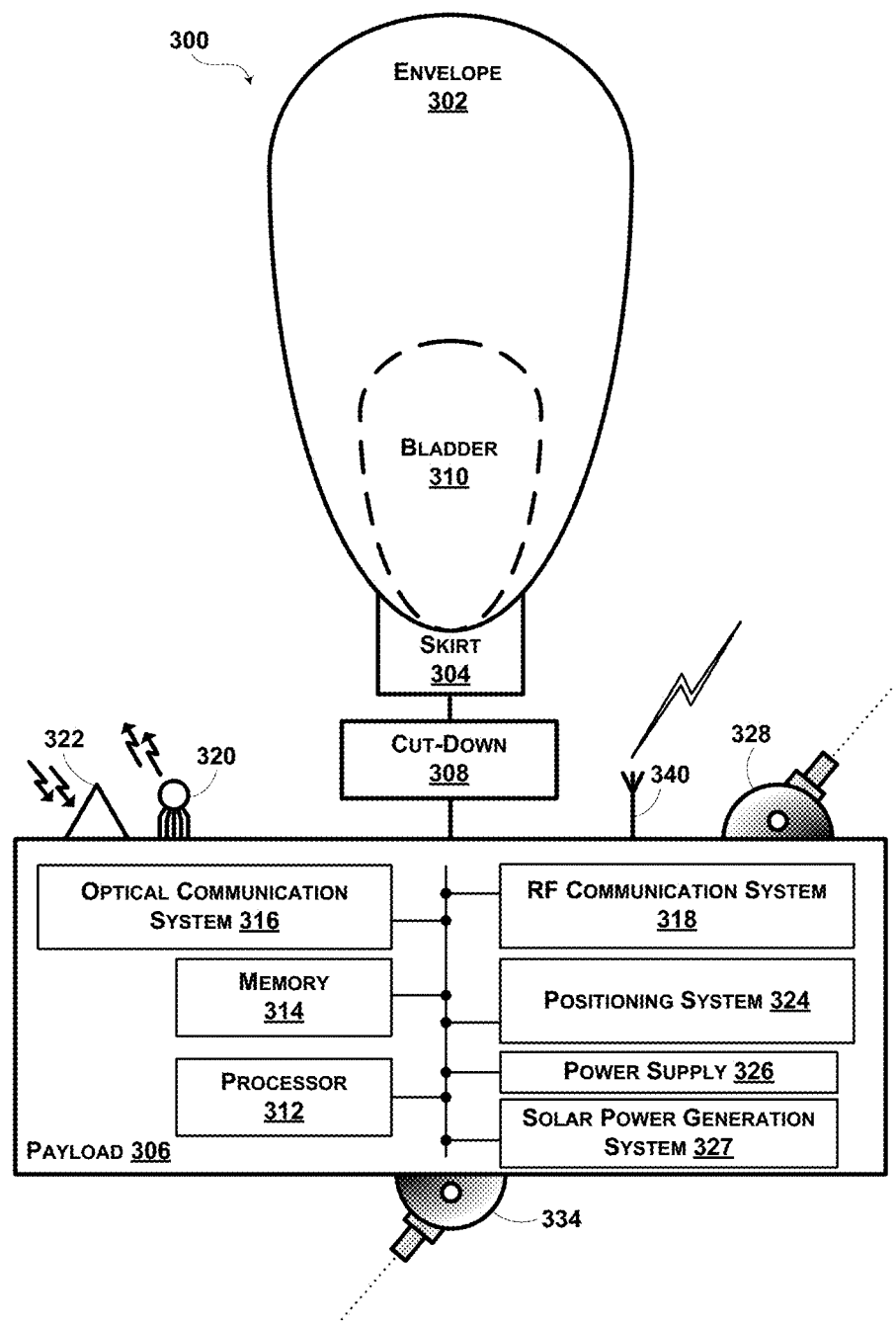
FIG. 3 shows a high-altitude balloon according to an example embodiment.

Various types of balloon systems may be incorporated in an exemplary balloon network. As noted above, an exemplary embodiment may utilize high-altitude balloons, which typically operate in an altitude range between 18 km and 25 km. FIG. 3 shows a high-altitude balloon 300, according to an exemplary embodiment. As shown, the balloon 300 includes an envelope 302, a skirt 304, a payload 306, and a cut-down system 308 that is attached between the balloon 302 and payload 306.

The envelope 302 and skirt 304 may take various forms, for instance, the envelope 302 and/or skirt 304 may be made of metalized Mylar or BoPet. Alternatively or additionally, some or all of the envelope 302 and/or skirt 304 may be constructed from a highly-flexible latex material or a rubber material such as chloroprene. Further, the shape and size of the envelope 302 and skirt 304 may vary depending upon the particular implementation. Additionally, the envelope 302 may be filled with various different types of gases, such as helium and/or hydrogen.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photo-diode receiver system). Further, payload 306 may include an RF communication system 318, which may transmit and/or receive RF communications via an antenna system 340. The payload may further include a positioning system 324 that can include a GPS or other location-based sensors.

The payload 306 may also include a power supply 326 to supply power to the various components of balloon 300. The power supply 326 may include or take the form of a rechargeable battery. In addition, the balloon 300 may include a solar power generation system 327. The solar power generation system 327 may include solar panels and could be used to generate power that charges and/or is distributed by the power supply 326.

Further, payload 306 may include various types of other systems 328 and sensors 334. For example, payload 306 may include one or more video and/or still cameras, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, various contemplated embodiments, altitude control of balloon 300 could be achieved, at least in part, by adjusting the rotation of the balloon with respect to the sun.

Further, the balloon 300 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location.

Alternatively, the altitudinal adjustments may be computed by a ground-based control system and communicated to the high-altitude balloon. As another alternative, the altitudinal adjustments may be computed by a ground-based or satellite-based control system and communicated to the high-altitude balloon. Furthermore, in some embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an exemplary embodiment, the cut-down system 308 may include a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302. Other types of cut-down systems and/or variations on the illustrated cut-down system 308 are possible as well.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground. In yet other embodiments, balloons may be serviced in-flight by specific service balloons or another type of service aerostat or service aircraft.

As described, movement and locations of balloons can vary since winds in the stratosphere may affect the locations of the balloons in a differential manner. A balloon in an example network may be configured to change its horizontal position by adjusting its vertical position (i.e., altitude). For example, by adjusting its altitude, a balloon may be able to find winds that will carry the balloon horizontally (e.g., latitudinally and/or longitudinally) to a desired horizontal location. Wind speed and/or direction may vary with altitude, and since current wind velocities as well as weather forecasts are available, in principle, a balloon may be directed to a location by identifying an altitude at which a wind direction takes a balloon to along a desired trajectory. However, a balloon without other forms of propulsion may be constrained to follow the wind and there may not be a single altitude with winds taking the balloon along the desired trajectory. In addition, to control a fleet of balloons, movement of the balloons should occur from one location above the surface of the Earth to another in a predictable manner.

In some examples, determining a fleetplan for a fleet of balloons may require staging balloons of the fleet into places ahead of time such that the balloons will be able to arrive at a landmark on time. For instance, a balloon may need to follow a trajectory that does not contribute usefully to goals during a first phase and a second phase such that the balloon can reach a desired landmark at the end of a third phase. This kind of staging may be useful when goal landmarks are spread non-uniformly throughout a fleet's coverage area. For example, there may be large regions (e.g., relative to a balloon's maximum range during a phase) requiring few or no balloons, but which may need to be traversed in order to satisfy a goal number of balloons for other regions. Such situations arise naturally, for example, when goal distributions are proportional to population density: there are a limited number of people in the oceans, few people on many parts of land, and many people in major cities.

In one case, a system may be configured to receive (or determine) a starting location of each balloon of a fleet of balloons and receive a sequence of coverage requirements for the region for a planning time period. As an example, the sequence of coverage requirements for the time period may specify a goal number of balloons for each of a plurality of landmarks within the region at various times T during the time period. The system may also be configured to divide the time period into phases based on distinct values of T in the sequence of coverage requirements: a first phase may be defined from a starting time of the time period to an earliest T; a second phase may be defined between the end of the first phase and a second earliest T, etc. Additionally, a set of landmarks may be associated with the start and end of each phase: the start of the first phase may use the initial location of each of the balloons as landmarks; the end of the first phase and the start of the second phase may share the set of landmarks associated with the earliest T, etc.

Based on the received information, the system may be further configured to determine trajectories that satisfy the sequence of coverage requirements for the region. To determine the trajectories, the system may initially establish possible routes for balloons within each phase. For each landmark at the start of a phase and for each landmark at the end of the phase, the system may determine how close to the end-of-phase landmark that a balloon starting from the start-of-phase landmark could get by traveling during the phase.

Figure 4:
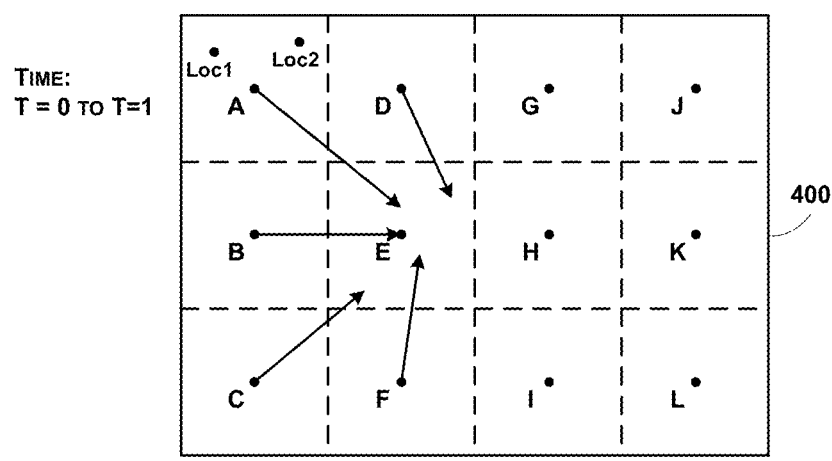
FIG. 4 illustrates example trajectories for a balloon that is traveling from one of a plurality of starting landmarks to a landmark E.

FIG. 4 illustrates example trajectories for a balloon that is traveling from a plurality of starting landmarks to a landmark E. Specifically, FIG. 4 illustrates trajectories from each of landmark A, B, C, D, and F to an ending landmark E. As shown in FIG. 4, a region 400 has been divided into a plurality of subregions, and the landmarks A-L have been established at the center of each subregion. Note that in some examples coverage requirements may specify a goal number of balloons to be located at one or more locations within the region 400, and the goal number of balloons may be added to the nearest landmark to determine the goal number of balloons for each landmark. For example, if an individual coverage requirement indicates that five balloons are desired at location Loc1 and seven balloons are desired at location Loc2, the desired number of balloons for landmark A may be determined to be twelve.

Additionally, although the landmarks A-L have been distributed uniformly throughout the region 400, the example is not meant to be limiting. In other instances, landmarks may be non-uniformly distributed within the region 400. For example, if a region covers the entire Earth, one or more oceans or countries may not include any landmarks.

The example trajectories may be determined based on estimated or predicted wind conditions at one or more altitudes. In the example of FIG. 4, the wind conditions are assumed to generally include winds flowing from left-to-right with additional variation in the vertical direction from time T=0 to T=1. Therefore, it is assumed that a balloon could not flow from landmarks G-L to landmark E from time T=0 to T=1, and for convenience, only trajectories from landmarks A, B, C, D, and F are shown in FIG. 4.

In one example, a reachability algorithm may be used to determine a measure of how close to a target location that a balloon could reach if the balloon was starting at another location within a region. For example, given a target time and target location as well as an initial time, the reachability algorithm may be configured to determine, for a grid of starting locations within a region, a measure of how close to the target location a balloon could get, if the balloon was flying from initial time to target time.

Figure 5:
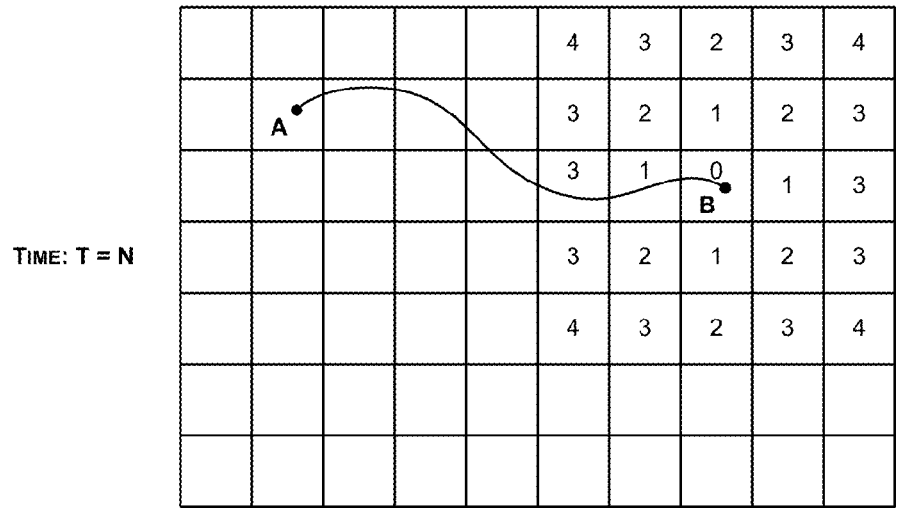
FIG. 5 illustrates an example cost value map where location A is a starting location of a balloon, location B is a desired final location, and example cost values are assigned to cells surrounding location B.

In one example, the reachability algorithm may be a backward planner. The backward planner may consider a problem of minimizing a cost function associated with a balloon path. As an example, the cost function may be a measure of how close a balloon gets to a target location by following a path. FIG. 5 illustrates an example cost value map where location A is a starting location of a balloon, location B is a desired final location, and example cost values are assigned to cells surrounding location B. For a time period from T=0 to T=N, the time period can be discretized in order to consider a situation of the balloon at times T=0, 1, 2, . . . , N. The region can also be discretized by dividing the region into a finite number of cells. For instance, FIG. 5 illustrates a region that has been divided into a number of cells (e.g., a 10×7 grid of cells). Although the region is represented as a rectangular grid, the example is not meant to be limiting.

At time T=N (e.g., a final time of a planning phase), there is no planning to do since the balloon will be at a final location at this time, and a cost value can be assigned to each cell based on a final location of the balloon. For time T=N, cost values may be systematically assigned such that a cell in which the desired location resides has a low cost and cells further away may be assigned a higher cost value (e.g., the farther away from the desired location, the higher the cost value). Thus, as shown, a cell in which the desired location B resides can be assigned a cost value of zero, and cost values for surrounding cells can be assigned higher cost values based on a distance away from the desired location cell. Cost values for all cells can be populated in this manner by increasing the cost value for a given cell based on the distance from the desired location.

Following, cost value maps of all cells may be generated for each time step T=0, 1, 2, . . . , N−1. To construct the cost value maps, a map may be generated for time T=N−1, and maps for previous times may be generated working backwards, such as next generating a map for time T=N−2, followed by T=N−3, and so on.

Figure 6:
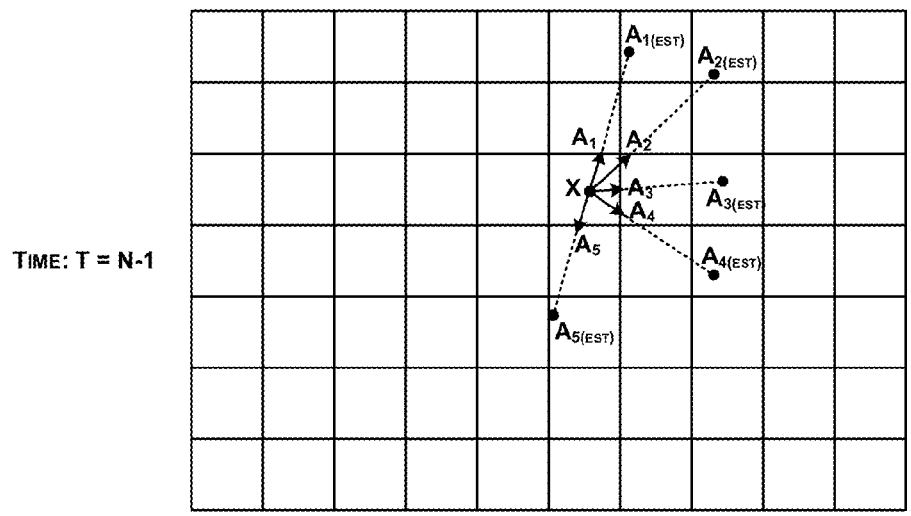
FIG. 6 illustrates an area divided into cells, and for a given cell labeled X, example wind vectors $A_1$-$A_5$ that are determined based on wind conditions at five different altitude levels.

After generating the map at time T=N, to generate a map for a next previous time step, possible altitudes and corresponding possible locations that can be reached over the time interval from T=N−1 to T=N for a balloon present in every cell at time T=N−1 can be estimated. For each cell and for one or more altitudes, an estimation of where the balloon will arrive by starting at that cell and flying at that altitude during the time interval can be determined. For example, weather predictions at time T=N−1 may indicate that, for a given cell, different wind conditions exist for different altitudes. FIG. 6 illustrates an area divided into cells (e.g., a 10 by 7 grid of cells), and for a given cell labeled X, example wind vectors $A_1$-$A_5$ that are determined based on wind conditions at five different altitude levels.

In some examples, wind vectors associated with different altitudes may be the same for each cell. In other examples, wind vectors associated with different altitudes may vary based on the location of the cell. For each cell, an estimation of where a balloon would travel to (e.g., destination cell) at the end of the time period if the balloon started at the cell and moved with a given wind vector is determined. To do so, a direction and magnitude (e.g., speed) of the estimated wind vector can be used to estimate a trajectory and distance that the balloon travels, and to determine estimated destination cells (e.g., $A_{1(EST)}$-$A_{5(EST)}$). FIG. 6 illustrates estimated destination cells for a balloon starting at cell X, and moving with one of the five wind vectors $A_1$-$A_5$. Example simulations can be performed to simulate movement of the balloons due to the estimated wind directions and speed, for example.

In some examples, further estimations may be made by a balloon traveling at a first altitude for a portion of a time interval and then changing to a second altitude for a remainder of the time interval. It could be possible that by traveling at any given number of combinations of altitudes, the winds may be able to carry the balloon to a desired location over the time interval.

As shown in the example in FIG. 6, wind vector $A_3$ results in the balloon reaching a closest proximity to the desired final location B at time T=N. Cost values for the balloon traveling along the wind vectors $A_1$-$A_5$ may be determined based on the stored cost values at T=N for the destination cells $A_{1(EST)}$-$A_{5(EST)}$. For example, the wind vector $A_3$ may be assigned a value of zero, and cost values for a remainder of the wind vectors may be assigned higher cost values for causing the balloon to travel to a location further away from the desired destination (e.g., such as a $A_4$ having cost of one, $A_5$ having cost of four, $A_2$ having cost of two, and $A_1$ having cost of three).

An altitude that results in a smallest cost value can be determined, and the altitude and cost value can be stored for the cell X for time T=N−1. Thus, in the example described, for cell X at time T=N−1, a balloon in cell X that has a desired destination location B at time T=N can be instructed to travel at altitude $A_3$. The same determinations may be performed for each cell of the area.

The process above may be repeated to determine cost value maps for time interval T=N−2 based on predicted wind conditions for T=N−2 to T=N−1 and the stored cost values for T=N−1. Further, the process may be repeated for time intervals T=N−3, T=N−4, and so on until T=0. In some examples, each cell of a given map has estimates of directions that are based on estimates of directions as determined for a subsequent time interval. This enables planning for a balloon to take a given path at a first time interval so that the balloon will be at a location needed during the next time interval to take appropriate action, and so on.

Referring back to the example illustrated by FIG. 4, the backward planner may be able to determine, for each starting landmark A-L, a minimum distance from landmark E that a balloon could get, if the balloon was flying from T=0 to T=1. For example, a cost value for each of landmarks A-L may be proportional to a distance such that a given cost value can be converted to a given three-dimensional distance. The backward planner may also be able to determine, for each starting landmark A-L, which altitude a balloon should fly at at T=0 in order to get as close as possible to the landmark E by T=1.

The backward planner is provided as one example mechanism for establishing possible routes between landmarks during a phase. However, other mechanisms that can determine, for a particular staring location/time and an ending location/time, how close to the ending location a balloon can get in the time period allotted, based on predicted wind velocities at one or more altitudes may also be utilized.

As an example, a forward planner may be used. For instance, the forward planner may determine for a particular starting location and time, how close to the ending location a balloon can get in a first time period based on predicted wind velocities at one or more altitudes. For the first time period, an altitude that leads to the closest location to the ending location may be selected. For a second time period, the forward planner may determine how close to the ending location a balloon can get during the second time period by starting from the ending location of the first time period. Based on predicted wind velocities at one or more altitudes during the second time period, a determination for the second time period regarding an altitude that leads to the closest location to the ending location may be made. The process may be repeated sequentially for additional time periods to ultimately determine how close a balloon could get to the ending location in the time period allotted.

In accordance with example embodiments, a backward planner can generate cost value maps at discrete time steps, from a target time to an initial time, in the form of contingency tables. The contingency tables at each time step can include one or more contingent balloon states, each including a set of state variables specifying geographic location (e.g., latitude and longitude), altitude, and battery level, possibly among other state variables. The balloon states are "contingent" in the sense that the values assigned to the state variables are contingent upon state variables of one or more previous contingent balloon states at a next earlier time step, and an action taken by the balloon while in the one or more previous contingent balloon states. The target time can correspond to a time at which a balloon is projected to reach a target location (e.g., target latitude and target longitude), and the initial time can correspond to a time at which the balloon begins (or is planned to begin) on a trajectory to the target location from an initial location of one or more balloon states at the initial time.

The backward planner can also specify for each contingent balloon state at each time step an action that a balloon should take in order to cause the balloon to follow on a predicted trajectory that results in a target location that is as close as possible to the goal location. A score can be assigned to each contingent balloon state based on how close the target location is to the goal location. Because the score assigned to each respective contingent balloon state is related to a distance between the target location for the respective contingent balloon state and the goal location, the contingency tables could also take a form that includes just the contingent balloon states and assigned scores. In this form, the action taken in a given contingent balloon state could be derived from a functional relation between the score, the goal location, and the implied target location.

In one example, the action at each time step can be an adjustment of balloon altitude. Specifically, the action can be one of increasing altitude, decreasing altitude, or maintaining altitude. The actions of increasing altitude and decreasing altitude can also include an amount by which the altitude should be changed. Determination of the action for each contingent balloon state at each time step may be made based on winds as forecast for each time step, location, and altitude. Each possible action can be associated with a command to execute the action. A balloon can be made to adjust or control its altitude by one or another of the specific techniques described above in connection with FIG. 3, for example. Thus, a command to adjust balloon altitude may be a command to carry out one or more steps according to the altitude control techniques.

In further accordance with example embodiments, a balloon flight plan can be generated by simulating a balloon flight trajectory as a simulated sequence of actions across the contingency tables at each time step, where one action is taken at each time step in a contingent state reached from a previous contingent state and a previous action. The simulated sequence of actions can be determined as one that results in a simulated trajectory that, from among other possible simulated trajectories, brings the balloon closest to the goal location. The simulated sequence of actions can then be converted into a corresponding sequence of commands for carrying out the actions, the sequence of commands thereby forming a balloon flight plan. In further accordance with example embodiments, the balloon flight plan can be encoded and transmitted to a balloon for execution by the balloon. The balloon may thereby be caused to attempt to follow a predicted trajectory determined according to the simulated trajectory.

One aspect of using a backward planner to derive a balloon flight plan is that the contingent states from the initial location at the initial time to the target location closest to the goal location at the target time are determined in reverse-chronological order, from the target time to the initial time. More particularly, the contingency tables at each time step are computed from the contingency tables at the next chronologically later time step. Conceptually, this corresponds to "working backward" from the goal to the start and identifying contingent intermediate states that can connect the start to the goal. The balloon flight plan, on the other hand, is derived by simulating actions in contingent states in forward-chronological order (or just "chronological order"). Thus, in deriving a balloon flight plan using a backward planner, the contingency tables are accessed in a temporal order that is opposite that in which the tables are computed.

In algorithmic terms, the backward planner iterates contingency tables in "computational iteration order," and the balloon flight plan is derived in a "reverse-iteration order." For the example embodiments described herein, computational iteration order is reverse-chronological and derivation order is chronological. It will be appreciated, however, that a general description of accessing (and/or processing) data in reverse-iteration order could also include computational iteration order being chronological and reverse-iteration order being reverse-chronological. Even more generally, computational iteration order and reverse-iteration order need not refer to forward or reverse temporal ordering. That is, they could refer forward or reverse spatial ordering (e.g., of spatial steps), or forward or reverse ordering of any given indexed sequence for which adjacent sequential elements are iteratively related.

In circumstances in which data are iteratively computed (or generated) in computational iteration order and accessed (and/or processed) in reverse-iteration order, the cost in terms of computational steps (e.g., computation time) and/or data storage (e.g., of iteratively computed data) can be (or become) a practical factor in algorithmic design and implementation. More specifically, conventional techniques for accessing iteratively computed data in reverse-iteration order may preclude or hamper practical implementations that need to satisfy one or more constraints on processing time and/or data storage. A balloon flight plan derived in reverse-iteration order with respect to a computational iteration order in which contingency tables are computed can be an example of a case in which conventional techniques can be inadequate. There is a need to overcome the limitations and/or inadequacies of conventional techniques.

In accordance with example embodiments, techniques for reverse-generation of iteratively-computed data are developed and described herein that are significantly better than conventional techniques in terms of processing time and data storage. The reverse-generation techniques are described herein by way of example for balloon flight planning, but are more generally applicable to access of data in reverse-iteration order. Before describing reverse-generation in the context of balloon flight planning, however, it is useful to first describe the technique in a much simpler context that serves to illustrate the concepts, without any loss of generality or applicability to other contexts, including balloon flight planning. The simpler context also serves to illustrate two conventional techniques for reverse-iteration access as well.

Figure 7:
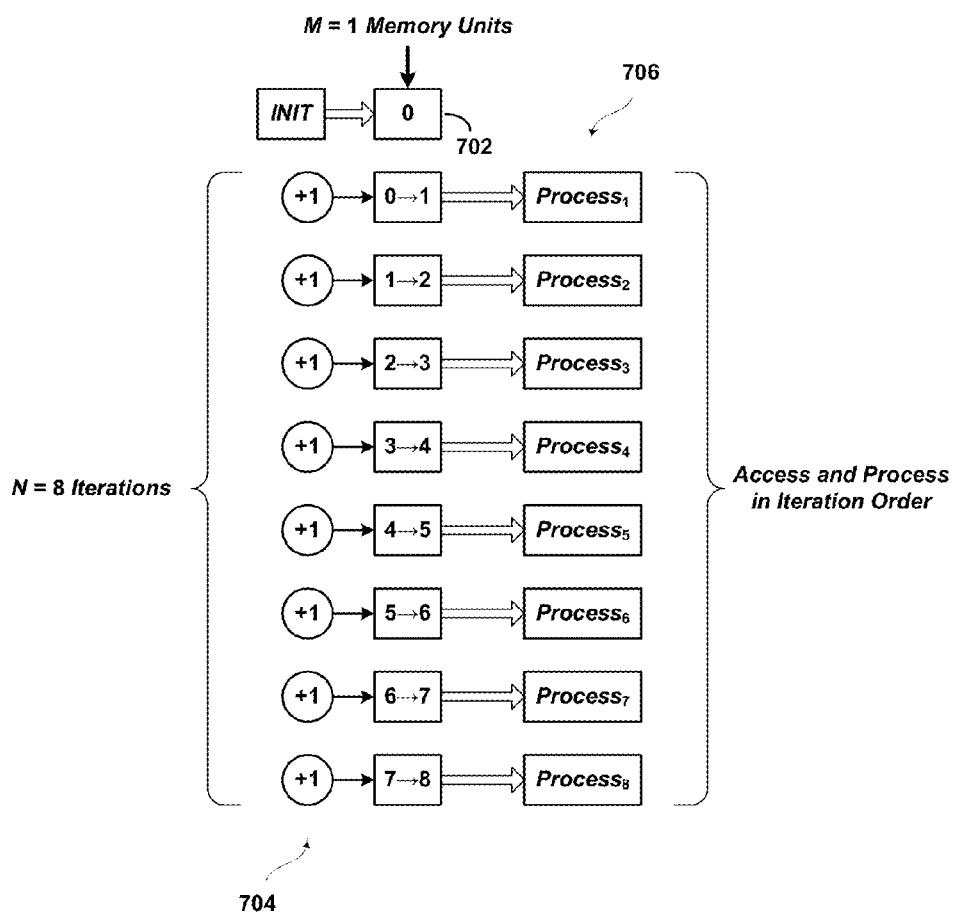
FIG. 7 illustrates an example of accessing an example iterator in iteration order.

FIG. 7 illustrates operational aspects of iteration as they relate to computing operations and data storage (e.g., memory) for a simple example of an iterator $f(x_n)$ that generates successive integers from n=1 to n=N. This simple iterative computation can be defined according to the iterative expression $f(x_{n+1})=f(x_n)+1$, n=1, . . . , N, where $f(x_1)=1$, as indicated in the box at the top of FIG. 7. For this example, N=8, so that the iterator generates the integers 1, 2, 3, . . . , 8. It will be appreciated that other integer values of N could be used as well. The data generated at each iteration step is just the next integer in the sequence, and for this example the iteratively computed data are accessed in the same order in which they are computed. That is, the question of accessing data in reverse-iteration order is not yet addressed in the example of FIG. 7.

As illustrated conceptually, accessing the data in computational iterative order can be achieved using one memory unit 702 to store each next iterated data value until that data value is accessed and processed by one of eight executions of an example representative process 706. The memory unit 702 can be some form of reusable storage (e.g., writeable computer-readable media such as Random Access Memory) suitable for recording data corresponding to an integer. After each access, the memory unit 702 can be overwritten with the next iteratively-computed data value. In this illustration, the process 706 is meant to represent any processing operation that accesses the iterated value, but is otherwise arbitrary. As a visual cue, the eight executions of the process 706 are labeled "Process$_1$,", "Process$_2$," . . . , "Process$_8$" to correspond to the index of the iteration that is accessed. That is, in this example illustration, Process$_1$ accesses iteration #1, Process$_2$ accesses iteration #2, . . . , and so on through Process$_8$ accessing iteration #8.

In the example, the iterations begin by initializing the memory unit 702 with the value zero. Thereafter, each new iteration applies the operation 704, which simply increments the contents of the single memory unit 702 by one. The iterative operation (or just "the iteration") is indicated by "+1" within a circle. In order to generate the integers from n=1, . . . , 8, the iterative operation is executed eight times. More generally, to generate the integers n=1, . . . , N, the iterative operation would be executed N times. This simple example illustrates that access of N iterations in computational iterative order can be achieved in N iterations with one memory unit. It will be appreciated that the illustration in FIG. 7 is not intended to necessarily represent a particular computer processing architecture.

Figure 8:
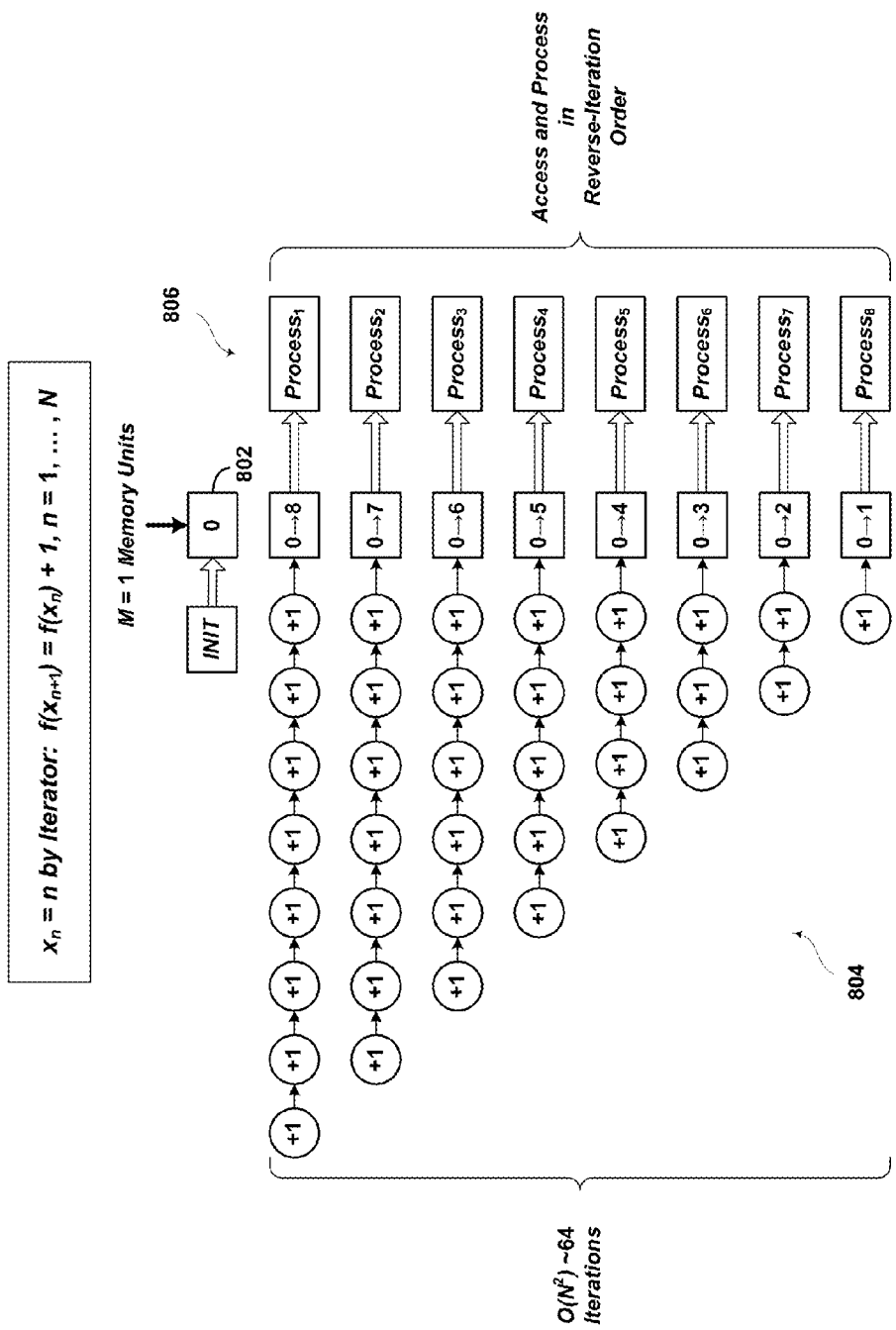
FIG. 8 illustrates an example of accessing an example iterator in reverse iteration order.

FIG. 8 illustrates a first conventional technique of accessing iteratively-computed data in reverse-iteration order, again for the example of an integer sequence iterator expressed analytically as $f(x_{n+1})=f(x_n)+1$, $n=1, \ldots, N$, where $f(x_1)=1$. Once more, N=8 for this example. In the example of FIG. 8, reverse-iteration access is again achieved using just one memory unit 802, but at a relatively high cost of iteration operations 804. Specifically, the Process' accesses iteration #8 (in this example, the integer 8), which is generated with by way of eight consecutive executions of the "+1" iteration applied to the single memory unit 802. Next, the Process$_2$ accesses iteration #7 (in this example, the integer 7), which is generated with by way of seven consecutive executions of the "+1" iteration applied to the single memory unit 802. This continues until the Process$_8$ accesses iteration #1 (in this example, the integer 1), which is generated with by way of one execution of the "+1" iteration applied to the single memory unit 802. Thus, nearly the entire iterative sequence needs to be executed for each new accessed value.

This simple illustration of the first conventional technique is an example of a type of repeated execution of an iterative sequence typically characterized as requiring "order $N^2$" iterations, abbreviated as "$O(N^2)$." More specifically, $O(N^2)$ signifies not that the number of iterations necessarily equals $N^2$, but, informally, that as N grows large (e.g., tends towards infinity), the number of iterations tends toward $N^2$. In particular, it can be seen that the number of iterations in the example of the first conventional technique is given by $N(N+1)/2$, which for N=8 is 36. As N increases, $N(N+1)$ tends towards $N^2$, thus the characterization as $O(N^2)$. A more mathematically rigorous definition can be expressed by stating that $f(x)$ is $O(N^2)$ if there exists some positive number $x_0$ and some positive constant C such that $|f(x)| \leq C \times |N^2|$ for all $x > x_0$.

In a similar way, the storage in this example can be characterized as "O(1)" (or "order 1") storage unit (where the size of one storage unit accommodates the data from one iteration). This signifies that as N increases, the number of storage units remains approximately constant. That is, for O(1), the number of storage units might not necessarily stay exactly equal to a particular value, but the number will not systematically increase (or decrease) as the number of iterations increases. In any case, the example of FIG. 8 illustrates one conventional technique for reverse-iteration access that uses O(1) storage unit and incurs $O(N^2)$ iterations.

Figure 9:
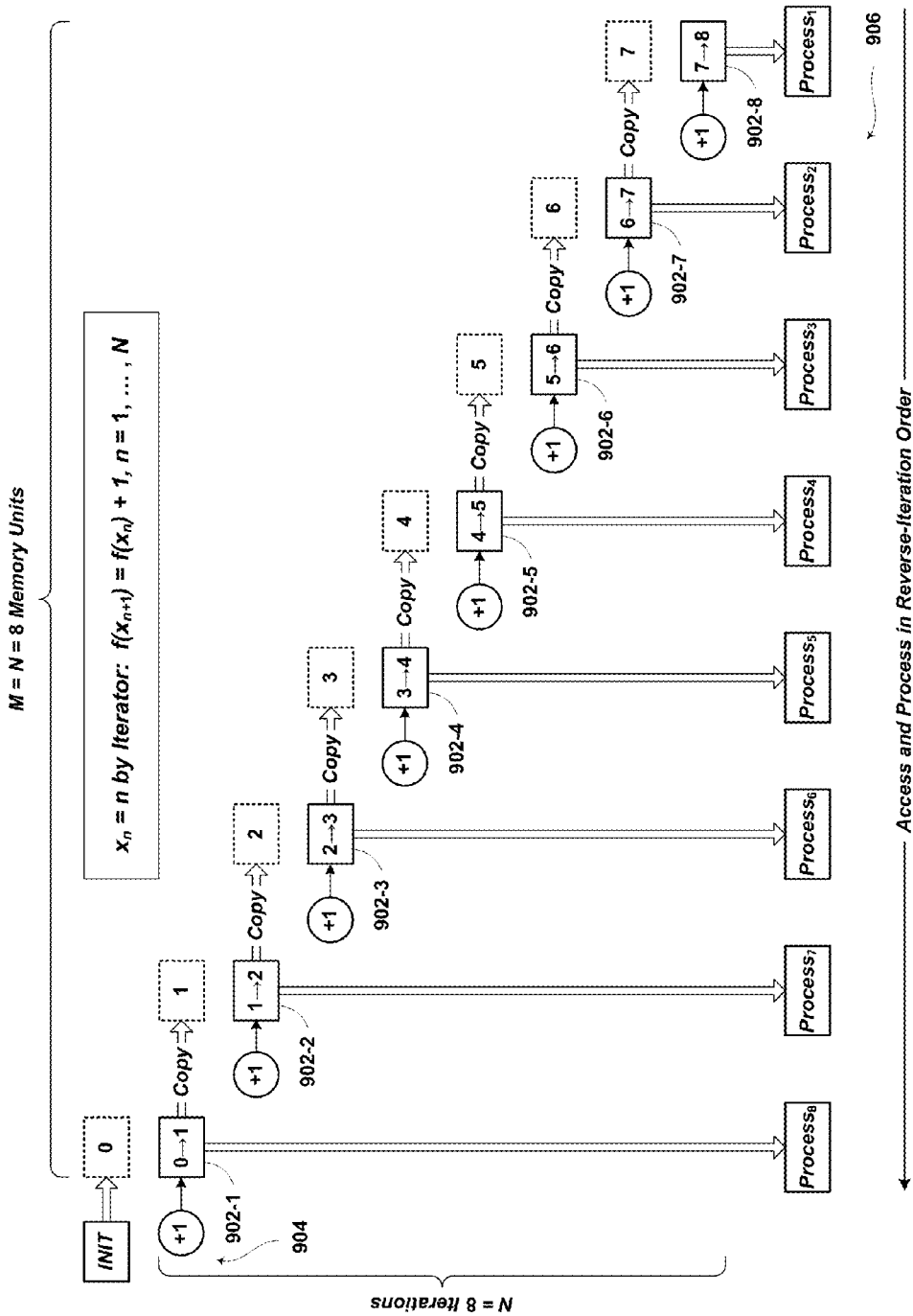
FIG. 9 illustrates another example of accessing an example iterator in reverse iteration order.

FIG. 9 illustrates a second conventional technique of accessing iteratively-computed data in reverse-iteration order, again for the example of an integer sequence iterator expressed analytically as $f(x_{n+1})=f(x_n)+1$, $n=1, \ldots, N$, where $f(x_1)=1$, and once more, N=8. In the example of FIG. 9, reverse-iteration access is achieved using just eight iterations 904, but requiring eight memory units 902-1, 902-2, 902-3, ..., 902-8. In this example, each iteration gets its own "dedicated" memory unit, which enables the entire sequence of iterated values to be computed and stored prior to accessing the values by the process 906. As shown, the memory unit 902-1 is first initialized to zero (signified by the dashed rectangular border), and then incremented to one by a first iteration of the "+1" operation. The solid rectangular border of the memory unit 902-1 signifies dedicated storage for the first iteration (dedicated in the sense that it is not reused to store any subsequent iterations, though its contents are not necessarily permanent).

For the second iteration, the value of the first iteration is copied to a second memory unit 902-2 (again, signified by the dashed rectangular border), and then incremented to two by a second iteration of the "+1" operation. The solid rectangular border of the memory unit 902-2 signifies dedicated storage for the second iteration. Similarly, for the third iteration, the value of the second iteration is copied to a third memory unit 902-3 (again, signified by the dashed rectangular border), and then incremented to three by a third iteration of the "+1" operation. Once more, the solid rectangular border of the memory unit 902-3 signifies dedicated storage for the third iteration. The iterations continue through the eighth iteration, where the value of the seventh iteration is copied to an eighth memory unit 902-8 (again, signified by the dashed rectangular border), and then incremented to eight by an eighth iteration of the "+1" operation. The solid rectangular border of the memory unit 902-8 again signifies dedicated storage for the eighth iteration.

Once all eight iterations have been computed and separately stored, reverse-iteration access can be a matter of accessing the eight memory units in the desired reverse order, as indicated by the backward-point arrow at the bottom of FIG. 9. That is, Process' accesses the memory unit 902-8, the Process$_2$ accesses the memory unit 902-7, and so on until the Process$_8$ accesses the memory unit 902-1. The second conventional technique illustrated in FIG. 9 can therefore be characterized as using O(N) storage units and incurring O(N) iterations. The meaning of O(N) is that the number of iterations, or of storage units, tends to N as N increases.

For the simple example of iterating a sequence of integers, each iteration incurs just one operation (e.g., "+1") and uses storage (temporary or dedicate) for just one integer. In this case, the computational and/or storage costs of either conventional technique for reverse-iteration access may not necessarily be pose significant practical design and/or implementation challenges. However, when the number of operations carried out at each iteration is large and/or the iterations involve complex computations, each of the $O(N^2)$ iterations of the first conventional technique can be correspondingly complex and/or computationally costly, making the total computational cost high in terms of time and complexity. And when the amount of storage required for each iteration is large, O(N) storage units of the second conventional technique can similarly become non-negligible in terms of a total amount of required memory. In addition, when reverse-iteration access is achieved by first computing and storing all of the iterated data, as in the second conventional technique, and the total amount of data is very large, accessing the data in any order can be subject to inefficiencies sometimes associated with memory access of large data sets. When both the iterative complexity and iterative storage are high, neither of the conventional techniques may be suitable for meeting design constraints that may be imposed on reverse-iteration access.

Figure 10A:
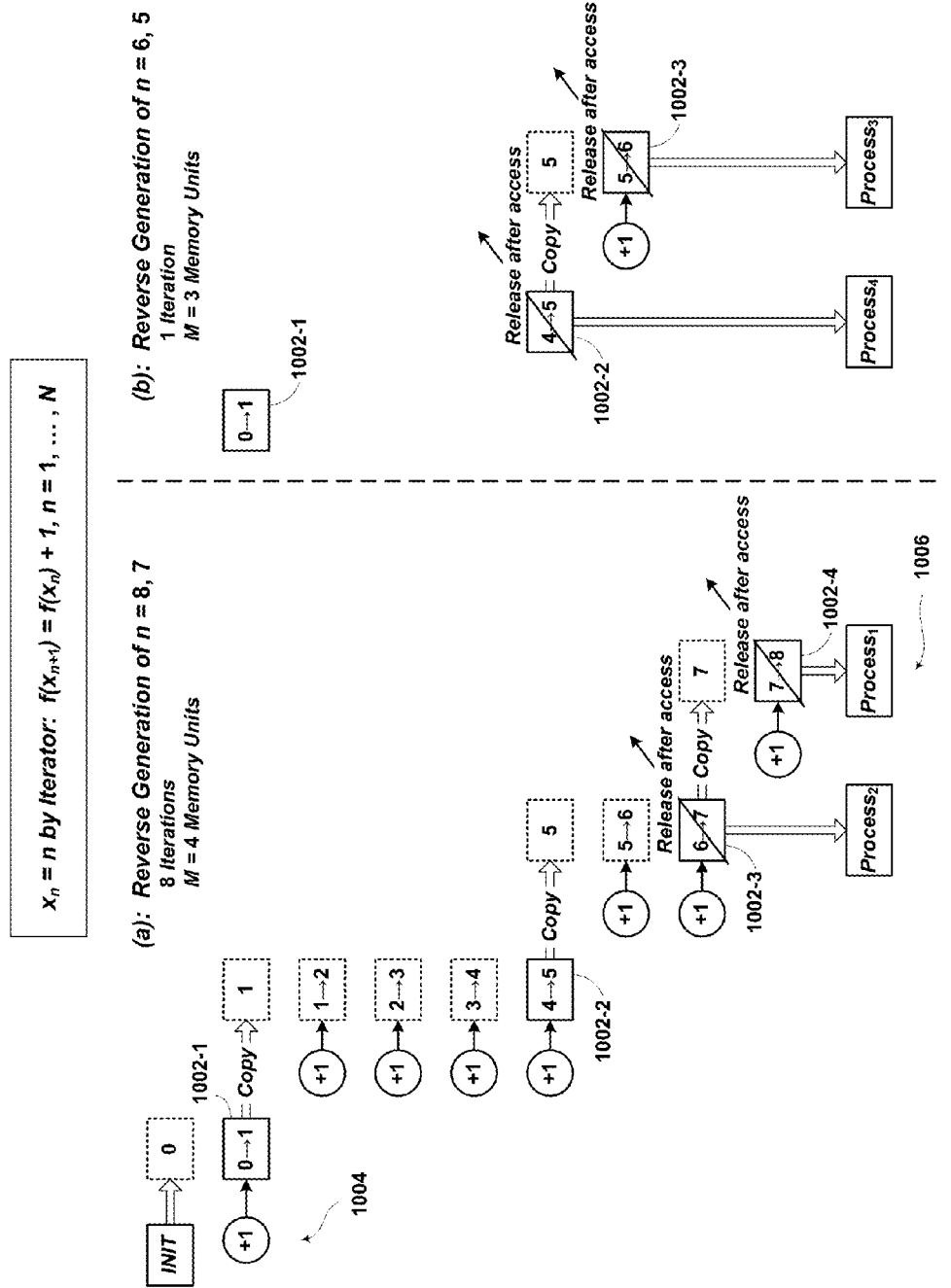
FIGS. 10A and 10B illustrates an example method of generating iterations of iterator in reverse iteration order, in accordance with example embodiments.
Figure 10B:
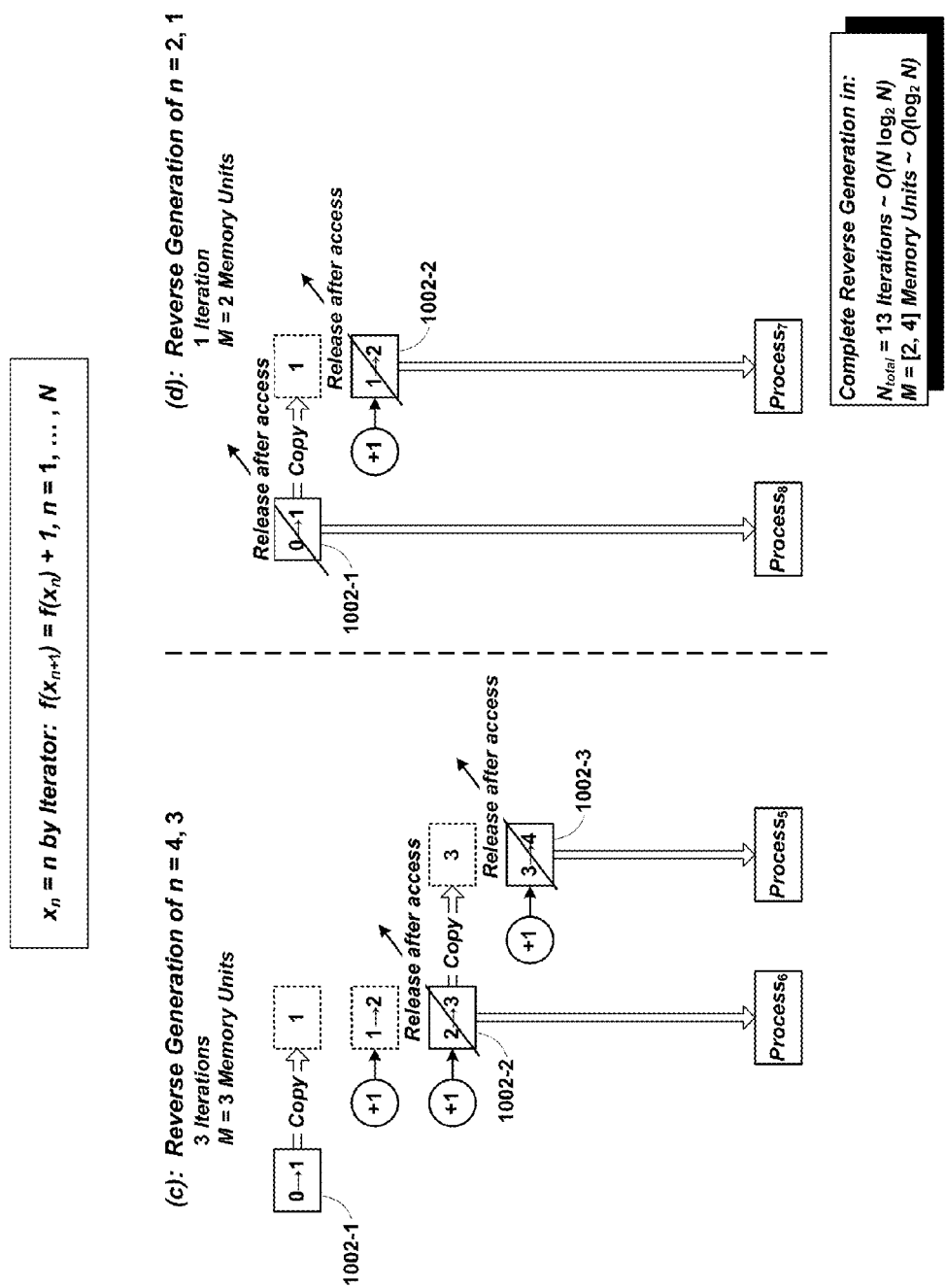

FIGS. 10A and 10B illustrate an example embodiment of a technique for reverse-generation of iterated data that is more efficient than either of the two conventional techniques when both storage size and computational complexity are potentially subject to some form of design and/or implementation constraint. Again for this example, the simple context of the integer sequence iterator $f(x_{n+1})=f(x_n)+1$, $n=1, \ldots, N$, where $f(x_1)=1$, and with N=8, serve the illustrative purposes. The general approach is to recursively sub-divide the N-length sequence by two and, upon each sub-division, forward-iterate only up to a particular element that is the next to be reverse-iteration accessed. At the same time, storage of iterated values is maintained for only those elements that support the current recursive iteration. As described below, the reverse-generated iterations may be accessed by the process 1006 in reverse-iteration order.

For the example form of the technique as illustrated in FIGS. 10A and 10B and described below, it is assumed that the value of N is known ahead of time. Thus for the current example, it is assumed known that N=8 prior to invoking the illustrative steps of the technique. When this is not the case, the technique can be modified to include first a linear search to determine the value of N. The extra computations incurred in the preliminary linear search do not alter the overall order of the number of computations of the technique for the case when N is known ahead of time (and the preliminary search is not needed).

The left side of FIG. 10, labeled "(a)," illustrates reverse generation of the elements for n=8 and n=7 (the integers 8 and 7 in this example). After a memory unit 1002-1 is initialized to zero, the value of the first iteration, $x_{n=1}=1$, is then stored in the memory unit 1002-1, and the value of the first iteration is copied to a second memory unit 1002-2. The value in the memory unit 1002-2 is then advanced N/2=4 iterations to $x_{n=1+4=5}=5$, and the value is copied to a third memory unit 1002-3. The value in the memory unit 1002-3 is then advanced N/4=2 iterations to $X_{n=5+2=7}=7$, and the value is copied to a fourth memory unit 1002-4. The value in the memory unit 1002-4 is then advanced N/8=1 iteration to $x_{n=7+1=8}=8$, which is the last ($N^{th}$) element of the iterated sequence. At this point Process' can access iteration #8; once the access is complete (e.g., the iterated data processed and/or consumed), the storage associated with the memory unit 1002-4 may be released. This is indicated by the arrow labeled "Release after access" overlaid on the memory unit 1002-4. Now $Process_2$ can access iteration #7 that is still stored in the memory unit 1002-3. Again, once the access is complete (e.g., the iterated data processed and/or consumed), the storage associated with the memory unit 1002-3 may be released. This is indicated by the arrow labeled "Release after access" overlaid on the memory unit 1002-3.

So far, iterations for n=8 and n=7 have been reverse-generated and reverse accessed by Process' and $Process_2$, respectively. As indicated, this used four memory units and incurred 8 iterations. Note that the memory units 1002-1 and 1002-2 still hold iteration values, while the memory units 1002-3 and 1002-4 have been released. Released memory may be considered as no longer counting in a current tally of memory usage.

The right side of FIG. 10A, labeled "(b)," illustrates reverse generation of the elements for n=6 and n=5 (the integers 6 and 5 in this example). The value $x_{n=1+4=5}=5$ in the memory unit 1002-2 is copied to the memory unit 1002-3 (which may or may not be the same physical location that previously held $x_{n=7}=7$). The value in the memory unit 1002-3 is then advanced N/8=1 iteration to $x_{n=5+1=6}=6$, which is the next reverse-generated element of the iterated sequence. At this point $Process_3$ can access iteration #6; once the access is complete (e.g., the iterated data processed and/or consumed), the storage associated with the memory unit 1002-3 may be released. As before, this is indicated by the arrow labeled "Release after access" overlaid on the memory unit 1002-3. Now $Process_4$ can access iteration #5 that is still stored in the memory unit 1002-2. Again, once the access is complete (e.g., the iterated data processed and/or consumed), the storage associated with the memory unit 1002-2 may be released. This, too, is indicated by the arrow labeled "Release after access" overlaid on the memory unit 1002-2.

Now, iterations for n=6 and n=5 have been reverse-generated and reverse accessed by $Process_3$ and $Process_4$, respectively. As indicated, this used three memory units and incurred just one iteration. The memory unit 1002-1 still holds the first iteration value, while the memory units 1002-2 and 1002-3 have been released.

Now moving on to FIG. 10B, the left side of the figure, labeled "(c)," illustrates reverse generation of the elements for n=4 and n=3 (the integers 4 and 3 in this example). The value $x_{n=1}=1$ in the memory unit 1002-1 is copied to the memory unit 1002-2 (which may or may not be the same physical location that previously held $x_{n=5}=5$). The value in the memory unit 1002-2 is then advanced N/4=2 iterations to $x_{n=1+2=3}=3$, and the value is copied to the memory unit 1002-3 (which may or may not be the same physical location that previously held $X_{n=6}=6$). The value in the memory unit 1002-3 is then advanced N/8=1 iteration to $x_{n=3+1=4}=4$, which is the next reverse-generated element of the iterated sequence. At this point $Process_5$ can access iteration #4; once the access is complete (e.g., the iterated data processed and/or consumed), the storage associated with the memory unit 1002-3 may be released. As before, this is indicated by the arrow labeled "Release after access" overlaid on the memory unit 1002-3. Now $Process_6$ can access iteration #3 that is still stored in the memory unit 1002-2. Again, once the access is complete (e.g., the iterated data processed and/or consumed), the storage associated with the memory unit 1002-2 may be released. This, too, is indicated by the arrow labeled "Release after access" overlaid on the memory unit 1002-2.

Now, iterations for n=4 and n=3 have been reverse-generated and reverse accessed by $Process_5$ and $Process_6$, respectively. As indicated, this used three memory units and incurred three iterations. The memory unit 1002-1 still holds the first iteration value.

The right side of FIG. 10B, labeled "(d)," illustrates reverse generation of the elements for n=2 and n=1 (the integers 2 and 1 in this example). The value $x_{n=1}=1$ in the memory unit 1002-1 is copied to the memory unit 1002-2 (which may or may not be the same physical location that previously held $x_{n=3}=3$). The value in the memory unit 1002-2 is then advanced N/8=1 iteration to $x_{n=1+1=2}=2$, which is the next reverse-generated element of the iterated sequence. At this point $Process_7$ can access iteration #2; once the access is complete (e.g., the iterated data processed and/or consumed), the storage associated with the memory unit 1002-2 may be released. As before, this is indicated by the arrow labeled "Release after access" overlaid on the memory unit 1002-2. Now $Process_8$ can access iteration #1 that is still stored in the memory unit 1002-1. Again, once the access is complete (e.g., the iterated data processed and/or consumed), the storage associated with the memory unit 1002-2 may be released. This, too, is indicated by the arrow labeled "Release after access" overlaid on the memory unit 1002-1.

Now, iterations for n=2 and n=1 have been reverse-generated and reverse accessed by $Process_7$ and $Process_8$, respectively. As indicated, this used two memory units and incurred just one iteration. All of the memory units have been released.

The complete reverse-generation and reverse-iteration access of the iteratively-computed sequence has been achieved using two, three, or four memory units at any one time, and a total of 13 iterations. More particularly, the example reverse-generation technique retains approximately one memory unit per factor-of-two sub-division of the N-length sequence. In computational terms, the reverse-generation technique uses $O(\log_2 N)$ memory units, because an N-length sequence can be recursively sub-divided by two $\log_2 N$ times. And as described below, the example reverse-generation technique can be shown to incur $O(N \log_2 N)$ iterations. $O(\log_2 N)$ memory units and $O(N \log_2 N)$ iterations is significantly better than either of the two conventional techniques in circumstances where both the memory usage per iteration is large and the computational cost of each iteration is high. Note that the reverse-generation technique could be adapted to subdividing an N-length sequence by factors greater than two. In this sense, the technique can be characterized more generally as subdividing an N-length sequence by at least a factor of two.

An example implementation of the reverse-generation technique can be described using example pseudo-code to specify logical programming instructions for carrying out steps and memory usage of a computational iterator, and that show how it can be invoked so as to reverse-generate the iterated data. By way of example, the pseudo-code implements a generalized iterator as an object that includes both storage for current data from the last iteration and callable logical operations to generate the next iteration (in computational iteration order) from the current data. The generalized iterator can also include callable logic to determine when the last iteration of a sequence has been reached (e.g., at N iterations). When invoked in the context of a calling program or logic, the generalized iterator can also be copied or duplicated, which results in new storage for the copied or duplicated instance of the iterator. Such an iterator is sometimes referred to as a copyable, finite length iterator. While a particular implementation of an iterator may include additional logic and/or instructions specific to the details of the iterative computation, the callable logic indicated above can be used to invoke the generalized iterator in a revere-generation context.

Table 1 illustrates example pseudo-code of a reverse-generation iterator, or just "reverse iterator" for the purposes of the discussion herein. In Table 1, text preceded by the number sign ("#") represents comments, not encoded logic instructions.

TABLE 1

```
reverse_iterate(iterator, iteration_length = None):
    # Determine iterator sequence length N on first call to reverse_iterate
    if iteration_length is None:
        iterator_length = len(copy(iterator))
    # No more elements to reverse iterate
    if iteration_length == 0:
        return
    # Recursive sub-divisions down to just N/N
    if iteration_length == 1:
        yield iterator.next( )
        return
    # Sub-divide this segment
    # [P1]: zero midpoint_index advances so far
    midpoint_index = floor(iteration length / 2)
    iterator_right = copy(iterator)
    # Recurse right (midpoint_index to n − 1)
    # [P2]: midpoint_index_advances ~ N/2
    right_iter_length = iteration_length − midpoint_index
    skip_n_items(iterator_right, midpoint_index)
    # [P3]: T(right_iter_length) ~ T(N/2)
    for item in reverse_iterate(iterator_right, right_iter_length):
        yield item
    # Recurse left (0 to midpoint_index1)
    # [P4]: T(midpoint_index) ~ T(N/2)
    for item in reverse_iterate(iterator, midpoint_index):
        yield item
```

The reverse iterator illustrated in Table 1 can be applied to any iterator, such as the iterator in the examples of FIGS. 7, 8, 9, and 10A and 10B. As discussed below, it can also be applied to an iterator that produces contingency tables for balloon flight planning.

The example reverse iterator logic can also serve as an explanation of the number of iterations incurred to reverse iterate an N-length iteration sequence. More particularly, let T(N) be the number of times an iterator must be advanced in order to reverse-iterate through an N-length iterator, where it assumed that N is known. In this case, T(N) satisfies the recursion relation $T(N)=2 T(N/2)+N/2$. Referring to the comments labeled "[P1]," "[P2]," "[P3]," and "[P4]" in the pseudo-code of Table 1, the well-known "Master Theorem" for analyzing the asymptotic behavior of so-called "divide-and-conquer" recursion algorithms may be applied. Specifically, the Master Theorem recurrence form $T(N)=aT(N/b)+f(N)$ for $a \geq 1$ and $b \geq 1$, and the "case 2" form $f(N)=O(N^c \log^k N)$, where $c=\log_b a$, can be applied to the reverse iterator in Table 1. For $a=2$, $b=2$, and $k=0$, it follows that $T(N)=O(N^c \log^{k+1} N)=O(N \log_2 N)$. Thus, $O(N \log_2 N)$ property of the example illustration in FIGS. 10A and 10B can be taken to apply generally to the technique of the reverse-generation of iterated data in accordance with example embodiments.

In accordance with example embodiments, an example implementation of reverse-generation of iterated data (or just reverse-iteration, for short) can be applied to planning a long-distance balloon flight for a fleet of balloons. By way of example, the planned flight could be a circumnavigation of the Earth, starting and ending at the same location. The balloons could be driven (or guided) along their respective paths by winds, and the entire trip could take two to three weeks or more. As described above, the flight plan could include a respective sequence of altitude adjustment commands for each balloon, each altitude adjustment intended to expose the balloon to expected wind conditions that are predicted to carry the balloon along at least a portion of a planned trajectory.

In further accordance with example embodiments, a backward planner can compute a complete set of contingency tables for the entire planned flight of the fleet. It may be expected that the data size of the complete set of contingency tables will be quite large, possibly exceeding a terabyte or more, for example. In addition, updated wind forecasts can be obtained approximately every six hours, and upon which the complete set of contingency tables may need to be recomputed. In one example, recomputation of the contingency tables can take on the order of ten minutes. Taking these example parameters as a context, a flight-planning approach that includes transmission of contingency tables to the balloons can be impractical.

In accordance with example embodiments, a strategy the includes both complete recomputation of the contingency tables on an hours-long time scale and periodic simulation of flight trajectories on a time scale of minutes can be used to periodically check and possibly update each balloon's flight plan (e.g., command sequence). The short time between flight plan updates can help ensure accuracy of each predicted trajectory, as well as optimal adherence of each balloon's flight path to the predicted trajectory. The example embodiment of the reverse-iterator can be used to reverse-generate the contingency tables for updating the simulated trajectories in a way that can satisfy constraints of time and data size.

Table 2 illustrates an example flight-planning strategy as a set of high-level steps at specified time scales.

TABLE 2

Every F = 6 hours: obtain latest wind forecasts and recompute entire contingency tables
Every W = 5 minutes:
   Obtain current state of all balloons in fleet (latitude, longitude, altitude, battery level)
   For each balloon:
      Candidate simulation: simulate balloon trajectory for the next h = 6 hours of
      flight to determine a candidate flight plan (candidate sequence of altitude
      adjustment commands), using reverse-iterator to reverse-generate contingency TABLE 2-continued tables with latest wind forecasts
Current simulation: simulate balloon trajectory for the next h = 6 hours of
flight using current flight plan (current sequence of altitude adjustment
commands) most recently sent to the balloon
Compare candidate flight plan with current flight plan: if the simulated
trajectory of candidate flight plan brings balloon greater than a threshold
closer to a goal location than the simulated trajectory of current flight plan,
replace the current flight plan with the candidate flight plan In the example strategy in Table 2, the recomputation every F=6 hours can be achieved running the backward planner in reverse-chronological order over the entire time range. As indicated in Table 2, the simulations run every W=5 minutes use the reverse iterator to reverse-generate the contingency tables so that they can be accessed in chronological order for deriving the candidate flight plans. Note that reverse-chronological order is computational iteration order for the backward planner, and chronological order is reverse-iteration order for the backward planner. It will be appreciated that F, W, and h are not limited to the values in the example, and that other values could be used.

It can be observed that if the threshold in the comparison step is sufficiently small, the result of the comparison might nearly always call for replacing the current flight plan with the candidate flight plan. In this case, the comparison step might just be eliminated, and the candidate flight plan always sent as a replacement to the balloon. Such an approach could be used, for example, when the cost of sending the updated flight plan to the balloon is considered to be negligible.

An example implementation of the reverse-generation technique applied to a backward flight planner can be described using example pseudo-code to specify logical programming instructions for carrying out steps and memory usage of an iterative backward planner, and that show how it can be invoked so as to reverse-generate the iterated data in a trajectory simulation. By way of example, the pseudo-code implements the iterative backward planner as a set of objects that include both storage for current contingency data from the last iteration and callable logical operations to generate the next iteration (in computational iteration order) from the current contingency data. The example pseudo-code also includes logic for invoking the backward planner in accordance with example embodiments to reverse-generate the contingency tables.

Table 3 illustrates example pseudo-code of reverse-generation iterative flight planner. Again, text preceded by the number sign ("#") represents comments, not encoded logic instructions. In the example pseudo-code, the backward planner implemented as function P that takes as arguments current time, current state, goal location, and goal time, and returns an action and a score for the action. Table 3 includes definitions of various terms, as well as some brief explanatory comments.

TABLE 3

```
# Planner P(ct, cs, gl, gt)->(action, score)
# Arguments:
#    ct = current time
#    cs = current balloon state (latitude, longitude, altitude, battery level)
#    gl = goal location (goal latitude, goal longitude)
#    gt = goal time (time at which balloon should reach the goal location)
# Outputs:
#    action = what action (ascend, descend, keep altitude) will allow the balloon to get as
#    close as possible to the goal location at the goal time, assuming that the balloon always
#    follows the action recommended by P(t, s(t), gl, gt) for all times between t between ct
#    and gt, where s is the state trajectory resulting from always following the prescribed
#    action and s(t) is the state in that trajectory at time t.
#    score = how close to the goal location the balloon will be at the goal time; that is, the
#    great circle distance between s(gt) and gl. Note that lower scores are better: they get the
#    balloon closer to the goal.
def P(ct, cs, gl, gt):
    # Compute the score at every point in the state space, one time step into the future
    next_score_grid = ScoreGrid(ct + dt, gl, gt)
    # The best action is the one that takes you to the highest score point in space.
    return ChooseBestAction(next_score_grid, ct, cs)
def ScoreGrid(ct, gl, gt):
    # Make a new iterator starting at the goal time gt and walk reverse chronologically
    # back to the desired time ct.
    iterator = ScoreGridIterator::Make(ct, gl, gt)
    while iterator.HasNext( ):
        iterator <-iterator.Next( )
    return iterator.score_grid
def ScoreGridIterator::Make(ct, gl, gt):
    let score_grid be an array with one entry for every state cs in the discretized state space.
    for each state cs:
        score_grid[cs] = great circle distance between cs and gl.
    t = gt
    return (t, ct, gt, score_grid)
def ScoreGridIterator::HasNext(iterator):
    if (iterator.t − dt) >= iterator.ct:
        return true
    else:
        return false
```

TABLE 3-continued

```
def ScoreGridIterator::Next(iterator):
    let new_score_grid = new array, one entry for every state cs in the discretized state space.
    t = iterator.t - dt
    for each state cs:
        new_ score_grid[cs] = ChooseBestAction(iterator.score_grid, t, cs).score
    return (t, iterator.ct, iterator.gt, new_score_grid)
def ScoreOfAction(ct, cs, next_score_grid, action):
    next_state = discretize(simulate(ct, cs, action, dt))
    return next_score_grid[next_state]
def ChooseBestAction(next_score_grid, ct, cs):
    best_action = argmin_action ScoreOfAction(ct, cs, next_score_grid, action)
    best_score = ScoreOfAction(ct, cs, next_score_grid, best_action)
    return (best_action, best_score)
# Invoke the planner P in the reverse-iterator and simulate a balloon trajectory
def FastSimulatePlan(start_state, starttime, gl, gt):
    iterator = ScoreGridIteraton:Make(starttime + dt, gl, gt)
    chronological_iterator = reverse_iterate(iterator)
    let cs be a copy of start_state
    let ct = start_time
    while chronological_iterator.HasNext( ):
        chronological_iterator <-chronological_iterator.Next( )
        next_score_grid = chronological_iterator.ScoreGrid
        action = ChooseBestAction(next_score_grid, ct, cs)
        cs <-simulate(ct, cs, action, dt)
        ct <-ct + dt
        append (ct, cs) to path
    return path
```

The example planner function P illustrates the use of dynamic programming to find the best trajectory. In the pseudo-code, the function simulate (ct, cs, action, dt) simulates a balloon starting in state cs at time ct and performing the given action for a time duration dt. The function discretize (cs) maps a balloon state cs to its closest discretized counterpart. The function ScoreGrid iterates through all the score grids in reverse chronological order from gt to ct, making (gt−ct)/dt calls to ScoreGridIterator::Next.

In executing FastSimulatePlan, chronological iterator is iterated all the way through just once. By using reverse iterator to reverse generate the score grid, the total number of iterations is $O(N \log_2 N)$, where $N=(gt-start\_time)/dt$. This is the number of calls to ScoreGridIterator::Next. The reverse_iterator maintains $O(\log_2 N)$ copies of the underlying iterator, including its storage.

Figure 11:
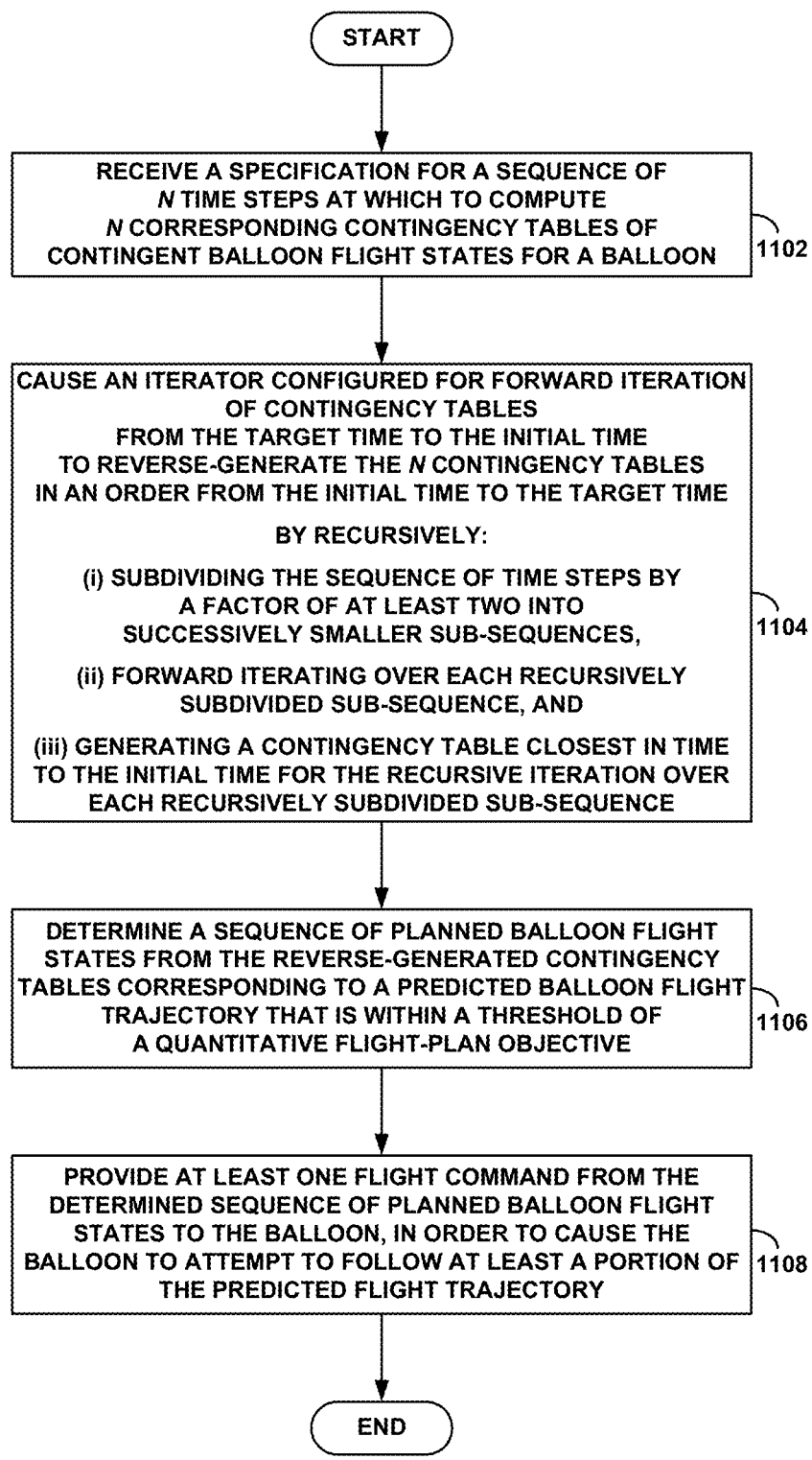
FIG. 11 is a flowchart illustrating an example method of reverse iteration in accordance with an example embodiment.

FIG. 11 is an example block diagram of a method 1100 to determine trajectories for a fleet of vehicles, in accordance with at least some embodiments described herein. Method 1100 shown in FIG. 11 presents an embodiment of a method that, for example, could be used with the balloon networks 100 and 204, for example, and may be performed by a device, a server, a control station, a balloon, or a combination of any components of the balloon networks 100 and 204. Method 1100 may include one or more operations, functions, or actions as illustrated by one or more of blocks 1102-1108. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 1100 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 1100 and other processes and methods disclosed herein, each block in FIG. 11 may represent circuitry that is wired to perform the specific logical functions in the process.

At block 1102, a system receives a specification for N time steps at which to compute N corresponding contingency tables of contingent balloon flight states for at least one balloon. The N time steps can define a sequence of time steps in a range between an initial time and a target time.

At block 1104, an iterator configured for recursively determining the contingency tables at successive time steps in a computational iteration order from the target time to the initial time is caused to reverse-generate the N contingency tables in an order from the initial time to the target time. Reverse-generation is caused by recursively: (i) subdividing the sequence of time steps by a factor of at least two into successively smaller sub-sequences, (ii) iterating in the computational iteration order over each recursively subdivided sub-sequence, and (iii) generating a contingency table closest in time to the initial time for the recursive iteration over each recursively subdivided sub-sequence.

At block 1106 a sequence of planned balloon flight states is determined from the reverse-generated contingency tables. The sequence is ordered from ordered from the initial time to the target time, and corresponds to a predicted balloon flight trajectory that is within a threshold of a quantitative flight-plan objective.

Finally, at block 1108, at least one flight command from the determined sequence of planned balloon flight states is provided to the at least one balloon, in order to cause the at least one balloon to attempt to follow at least a portion of the predicted flight trajectory.

In accordance with example embodiments, receiving the specification for N time steps could entail receiving the initial time, the target time, and a time-step size. In this way, N could be determined as a difference between the initial time and the target time divided by the time-step size.

In accordance with example embodiments, reverse-generating the N contingency tables in the order from the initial time to the target time further comprises reverse-generating the N contingency tables can be accomplished in $O(N \log_2 N)$ iteration steps. In addition, and during any given iteration step of the $O(N \log_2 N)$ iteration steps, contingency tables from $O(\log_2 N)$ other iteration steps may be retained.

Also in accordance with example embodiments, each of the contingent balloon flight states can include a latitude state variable, a longitude state variable, an altitude state variable, and a battery level state variable. For a deployment in which battery power is not necessarily a significant limiting factor of overall flight duration (e.g., if batteries can be recharged during flight, and/or if battery power consumption is below some threshold rate), battery level could potentially be omitted as a contingent balloon flight state. In this case, battery power might still be considered a state variable, but just not one considered sufficiently relevant to flight planning vis-à-vis contingency tables.

The contingency tables can also include at each of the N time steps one or more contingent balloon flight states, each having a contingent flight action and a respective target location for the at least one balloon that is predicted to be reachable at the target time by a sequence of contingent balloon flight states at intervening time steps. Each of the one or more contingent balloon flight states at each of the N time steps can be assigned a respective score based on a distance between its respective target location and a goal location for the at least one balloon. The goal location can be the same for all of the one or more contingent balloon flight states of the at least one balloon, and the score can increase inversely to distance between target location and goal location. In this formulation, the smaller the distance between the target location the goal location, the higher the score. For flight planning purposes, a higher score would be deemed preferable to a lower score, since it corresponds to getting closer to the goal location. As an alternative, a penalty that increases with distance between target location and goal location could be assigned to each contingent balloon flight state. In this alternative formulation, the smaller the distance between the target location the goal location, the lower the penalty, and a lower penalty would be deemed preferable to a higher penalty, since it corresponds to again getting closer to the goal location.

The relationship between contingent balloon flight state, contingent flight action, target location, goal location, and score can be quantified in a functional form, such that any one of these quantities can be determined or derived from the others. For example, given a particular contingent balloon flight state and a target location score, and a known (or specified) goal location, a score can be derived, and a corresponding contingent flight action determined. Therefore, various specific forms of contingency tables could be devised in accordance with example embodiments. In addition to the example above, which includes contingent balloon flight state, target location, contingent flight action, and score, other example forms of contingency tables could include just scores and contingent balloon flight states, just target locations and contingent balloon flight states, just contingent flight actions and contingent balloon flight states. Other example forms of contingency tables that support flight planning are possible as well.

In further accordance with example embodiments, determining the sequence of planned balloon flight states from the reverse-generated contingency tables can entail determining a sequence of planned flight actions to execute at each of the N time steps by choosing one contingent flight action from each of the N time steps such that a predicted target location for the sequence of planned flight actions is closest to the goal location. More particularly, determining the sequence of planned flight actions to execute at each of the N time steps can entail simulating one or more balloon flight trajectories by simulating execution of each of one or more sequences of contingent flight actions, and determining a particular sequence of contingent flight actions from among the one or more sequences of contingent flight actions for which a simulated target location is closest to the goal location.

In further accordance with example embodiments, the contingent flight action for each of the one or more contingent flight states can be one of three action commands to execute at a specified time. In particular, the three action commands can be increase balloon altitude, decrease balloon altitude, and maintain balloon altitude.

In accordance with example embodiments, the iterator could be a backward planner, such that the initial time is chronologically earlier than the target time, and the at least one balloon is projected to be at the goal location at the target time. Then, recursively determining the contingency tables at successive time steps in a computational iteration order from the target time to the initial time can entail recursively determining in backward chronological order at least one backward sequence of contingent balloon flight states from the goal location at the target time to an initial contingent balloon flight state at the initial time.

Figure 12:
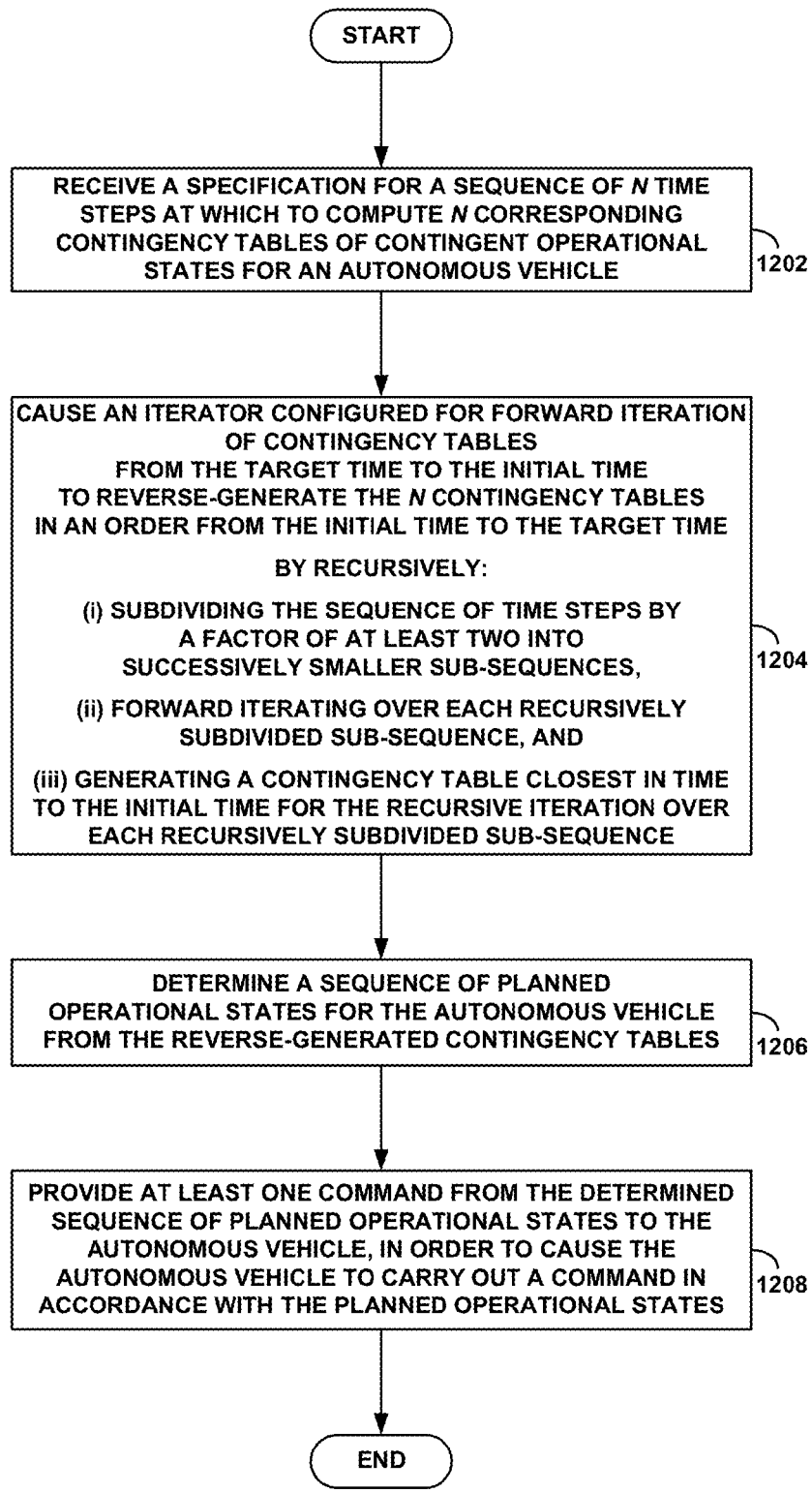
FIG. 12 is a flowchart illustrating another example method of reverse iteration in accordance with an example embodiment.

Application of reverse-generation of iterated contingency data for balloon flight planning can be generalized to planning system control for other autonomous devices as well. FIG. 12 illustrates an example method for such an application of reverse-iteration.

At block 1202, a system receives a specification for N time steps at which to compute N corresponding contingency tables of contingent operational states for an autonomous device or "vehicle." The N time steps can define a sequence of time steps in a range between an initial time and a target time.

At block 1204, an iterator configured for recursively determining the contingency tables at successive time steps in a computational iteration order from the target time to the initial time is caused to reverse-generate the N contingency tables in an order from the initial time to the target time. Reverse-generation is caused by recursively: (i) subdividing the sequence of time steps by a factor of at least two into successively smaller sub-sequences, (ii) iterating in the computational iteration order over each recursively subdivided sub-sequence, and (iii) generating a contingency table closest in time to the initial time for the recursive iteration over each recursively subdivided sub-sequence.

At block 1206 a sequence of planned operational states is determined from the reverse-generated contingency tables. The sequence is ordered from ordered from the initial time to the target time, and corresponds to a predicted operational state trajectory that is within a threshold of a quantitative operational plan objective.

Finally, at block 1208, at least one command from the determined sequence of planned operational states is provided to the autonomous device (vehicle), in order to cause the at least one autonomous device to carry out a command in accordance with the planned operational states.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method for planning balloon flight states configured to cause at least one balloon to fly substantially along a predicted path, the method comprising:
    at a system including one or more processors, receiving a specification for N time steps at which to compute N corresponding contingency tables of contingent balloon flight states for the at least one balloon, wherein the N time steps define a sequence of time steps in a range between an initial time and a target time;
    by an iterator implemented by at least one of the one or more processors, reverse-accessing the N contingency tables in an order from the initial time to the target time, wherein the iterator is configured for recursively determining the contingency tables at successive time steps in a computational iteration order from the target time to the initial time;
    for the at least one balloon, determining a sequence of planned balloon flight states from the reverse-accessed contingency tables, ordered from the initial time to the target time, corresponding to a predicted balloon flight trajectory that is within a threshold of a quantitative flight-plan objective; and
    causing the at least one balloon to execute at least one flight command from the determined sequence of planned balloon flight states, to cause the at least one balloon to attempt to follow at least a portion of the predicted flight trajectory,
    wherein reverse-accessing the N contingency tables in the order from the initial time to the target time is achieved in $O(N \log_2 N)$ iterations using memory for $O(\log_2 N)$ contingency tables, and comprises:
    recursively (i) subdividing the sequence of time steps by a factor of at least two into successively smaller sub-sequences, (ii) iterating in the computational iteration order over each recursively subdivided sub-sequence, and (iii) accessing a contingency table closest in time to the initial time for the recursive iteration over each recursively subdivided sub-sequence.

2. The method of claim 1, wherein receiving the specification for N time steps comprises receiving the initial time, the target time, and a time-step size, and wherein N is determined as a difference between the initial time and the target time divided by the time-step size.

3. The method of claim 1, wherein each of the contingent balloon flight states comprises a latitude state variable, a longitude state variable, an altitude state variable, and a battery level state variable, wherein the contingency tables include at each of the N time steps one or more contingent balloon flight states each having a contingent flight action and a respective target location for the at least one balloon that is predicted to be reachable at the target time by a sequence of contingent balloon flight states at intervening time steps, and wherein each of the one or more contingent balloon flight states at each of the N time steps is assigned a respective score based on a distance between its respective target location and a goal location for the at least one balloon, the goal location being the same for all of the one or more contingent balloon flight states of the at least one balloon, and score increasing inversely to distance between target location and goal location.

4. The method of claim 3, wherein determining the sequence of planned balloon flight states from the reverse-accessed contingency tables comprises determining a sequence of planned flight actions to execute at each of the N time steps by choosing one contingent flight action from each of the N time steps such that a predicted target location for the sequence of planned flight actions is closest to the goal location.

5. The method of claim 4, wherein determining the sequence of planned flight actions to execute at each of the N time steps by choosing one contingent flight action from each of the N time steps such that the predicted target location for the sequence of planned flight actions is closest to the goal location comprises: simulating one or more balloon flight trajectories by simulating execution of each of one or more sequences of contingent flight actions, each of the one or more sequences of contingent flight actions including one contingent flight action from each of the N time steps and being ordered from the initial time to the target time; and determining a particular sequence of contingent flight actions from among the one or more sequences of contingent flight actions for which a simulated target location is closest to the goal location.

6. The method of claim 3, wherein the contingent flight action for each of the one or more contingent flight states is one of three action commands to execute at a specified time, the three action commands being increase balloon altitude, decrease balloon altitude, and maintain balloon altitude.

7. The method of claim 3, wherein the initial time is chronologically earlier than the target time, wherein the at least one balloon is projected to be at the goal location at the target time, and wherein recursively determining the contingency tables at successive time steps in a computational iteration order from the target time to the initial time comprises recursively determining in backward chronological order at least one backward sequence of contingent balloon flight states from the goal location at the target time to an initial contingent balloon flight state at the initial time.

8. A non-transitory computer-readable storage medium having stored therein instructions, that when executed by a computing device, cause the computing device to perform functions for planning balloon flight states configured to cause at least one balloon to fly substantially along a predicted path, the functions comprising:
    receiving a specification for N time steps at which to compute N corresponding contingency tables of contingent balloon flight states for the at least one balloon, wherein the N time steps define a sequence of time steps in a range between an initial time and a target time;
    reverse-accessing the N contingency tables in an order from the initial time to the target time by using an iterator function configured for recursively determining the contingency tables at successive time steps in a computational iteration order from the target time to the initial time;
    for the at least one balloon, determining a sequence of planned balloon flight states from the reverse-accessed contingency tables, ordered from the initial time to the target time, corresponding to a predicted balloon flight trajectory that is within a threshold of a quantitative flight-plan objective; and causing the at least one balloon to execute at least one flight command from the determined sequence of planned balloon flight states, to cause the at least one balloon to attempt to follow at least a portion of the predicted flight trajectory, wherein reverse-accessing the N contingency tables in the order from the initial time to the target time is achieved in $O(N \log_2 N)$ iterations using memory for $O(\log_2 N)$ contingency tables, and comprises:

recursively (i) subdividing the sequence of time steps by a factor of at least two into successively smaller sub-sequences, (ii) iterating in the computational iteration order over each recursively subdivided sub-sequence, and (iii) accessing a contingency table closest in time to the initial time for the recursive iteration over each recursively subdivided sub-sequence.

9. The non-transitory computer-readable storage medium of claim 8, wherein receiving the specification for N time steps comprises receiving the initial time, the target time, and a time-step size, and wherein N is determined as a difference between the initial time and the target time divided by the time-step size.

10. The non-transitory computer-readable storage medium of claim 8, wherein each of the contingent balloon flight states comprises a latitude state variable, a longitude state variable, an altitude state variable, and a battery level state variable, wherein the contingency tables include at each of the N time steps one or more contingent balloon flight states each having a contingent flight action and a respective target location for the at least one balloon that is predicted to be reachable at the target time by a sequence of contingent balloon flight states at intervening time steps, and wherein each of the one or more contingent balloon flight states at each of the N time steps is assigned a respective score based on a distance between its respective target location and a goal location for the at least one balloon, the goal location being the same for all of the one or more contingent balloon flight states of the at least one balloon, and score increasing inversely to distance between target location and goal location.

11. The non-transitory computer-readable storage medium of claim 10, wherein determining the sequence of planned balloon flight states from the reverse-accessed contingency tables comprises determining a sequence of planned flight actions to execute at each of the N time steps by choosing one contingent flight action from each of the N time steps such that a predicted target location for the sequence of planned flight actions is closest to the goal location.

12. The non-transitory computer-readable storage medium of claim 11, wherein determining the sequence of planned flight actions to execute at each of the N time steps by choosing one contingent flight action from each of the N time steps such that the predicted target location for the sequence of planned flight actions is closest to the goal location comprises: simulating one or more balloon flight trajectories by simulating execution of each of one or more sequences of contingent flight actions, each of the one or more sequences of contingent flight actions including one contingent flight action from each of the N time steps and being ordered from the initial time to the target time; and determining a particular sequence of contingent flight actions from among the one or more sequences of contingent flight actions for which a simulated target location is closest to the goal location.

13. The non-transitory computer-readable storage medium of claim 10, wherein the contingent flight action for each of the one or more contingent flight states is one of three action commands to execute at a specified time, the three action commands being increase balloon altitude, decrease balloon altitude, and maintain balloon altitude.

14. The non-transitory computer-readable storage medium of claim 10, wherein the initial time is chronologically earlier than the target time, wherein the at least one balloon is projected to be at the goal location at the target time, and wherein recursively determining the contingency tables at successive time steps in a computational iteration order from the target time to the initial time comprises recursively determining in backward chronological order at least one backward sequence of contingent balloon flight states from the goal location at the target time to an initial contingent balloon flight state at the initial time.

15. A system for planning balloon flight states configured to cause at least one balloon to fly substantially along a predicted path, the system comprising:

at least one processor; and data storage comprising program instructions executable by the at least one processor to cause the system to perform functions comprising:

receiving a specification for N time steps at which to compute N corresponding contingency tables of contingent balloon flight states for the at least one balloon, wherein the N time steps define a sequence of time steps in a range between an initial time and a target time;

reverse-accessing the N contingency tables in an order from the initial time to the target time by using an iterator function configured for recursively determining the contingency tables at successive time steps in a computational iteration order from the target time to the initial time;

for the at least one balloon, determining a sequence of planned balloon flight states from the reverse-accessed contingency tables, ordered from the initial time to the target time, corresponding to a predicted balloon flight trajectory that is within a threshold of a quantitative flight-plan objective; and causing the at least one balloon to execute at least one flight command from the determined sequence of planned balloon flight states, to cause the at least one balloon to attempt to follow at least a portion of the predicted flight trajectory, wherein reverse-accessing the N contingency tables in the order from the initial time to the target time is achieved in $O(N \log_2 N)$ iterations using memory for $O(\log_2 N)$ contingency tables, and comprises:

recursively (i) subdividing the sequence of time steps by a factor of at least two into successively smaller sub-sequences, (ii) iterating in the computational iteration order over each recursively subdivided sub-sequence, and (iii) accessing a contingency table closest in time to the initial time for the recursive iteration over each recursively subdivided sub-sequence.

16. The system of claim 15, wherein receiving the specification for N time steps comprises receiving the initial time, the target time, and a time-step size, and wherein N is determined as a difference between the initial time and the target time divided by the time-step size.

17. The system of claim 15, wherein each of the contingent balloon flight states comprises a latitude state variable, a longitude state variable, an altitude state variable, and a battery level state variable, wherein the contingency tables include at each of the N time steps one or more contingent balloon flight states each having a contingent flight action and a respective target location for the at least one balloon that is predicted to be reachable at the target time by a sequence of contingent balloon flight states at intervening time steps, and wherein each of the one or more contingent balloon flight states at each of the N time steps is assigned a respective score based on a distance between its respective target location and a goal location for the at least one balloon, the goal location being the same for all of the one or more contingent balloon flight states of the at least one balloon, and score increasing inversely to distance between target location and goal location.

18. The system of claim 17, wherein determining the sequence of planned balloon flight states from the reverse-accessed contingency tables comprises determining a sequence of planned flight actions to execute at each of the N time steps by choosing one contingent flight action from each of the N time steps such that a predicted target location for the sequence of planned flight actions is closest to the goal location.

19. The system of claim 18, wherein determining the sequence of planned flight actions to execute at each of the N time steps by choosing one contingent flight action from each of the N time steps such that the predicted target location for the sequence of planned flight actions is closest to the goal location comprises: simulating one or more balloon flight trajectories by simulating execution of each of one or more sequences of contingent flight actions, each of the one or more sequences of contingent flight actions including one contingent flight action from each of the N time steps and being ordered from the initial time to the target time; and determining a particular sequence of contingent flight actions from among the one or more sequences of contingent flight actions for which a simulated target location is closest to the goal location.

20. The system of claim 15, wherein the contingent flight action for each of the one or more contingent flight states is one of three action commands to execute at a specified time, the three action commands being increase balloon altitude, decrease balloon altitude, and maintain balloon altitude.

21. The system of claim 15, wherein the initial time is chronologically earlier than the target time, wherein the at least one balloon is projected to be at the goal location at the target time, and wherein recursively determining the contingency tables at successive time steps in a computational iteration order from the target time to the initial time comprises recursively determining in backward chronological order at least one backward sequence of contingent balloon flight states from the goal location at the target time to an initial contingent balloon flight state at the initial time.

* * * * *